(12) United States Patent
Meehan et al.

(10) Patent No.: US 8,161,530 B2
(45) Date of Patent: *Apr. 17, 2012

(54) BEHAVIORMETRICS APPLICATION SYSTEM FOR ELECTRONIC TRANSACTION AUTHORIZATION

(75) Inventors: Timothy Erickson Meehan, Richland, WA (US); Herbert Lewis Alward, Coeur d'Alene, ID (US)

(73) Assignee: Identity Metrics, Inc., Aliso Viejo, CA (US)

(*) Notice: Subject to any disclaimer, the term of this patent is extended or adjusted under 35 U.S.C. 154(b) by 1313 days.

This patent is subject to a terminal disclaimer.

(21) Appl. No.: 11/827,656

(22) Filed: Jul. 11, 2007

(65) Prior Publication Data

US 2008/0091453 A1   Apr. 17, 2008

Related U.S. Application Data

(60) Provisional application No. 60/819,946, filed on Jul. 11, 2006.

(51) Int. Cl.
*G06F 21/00* (2006.01)

(52) U.S. Cl. .......................................... 726/4; 713/186

(58) Field of Classification Search .................. 726/1–7, 726/26–31; 713/182, 186, 168
See application file for complete search history.

(56) References Cited

U.S. PATENT DOCUMENTS

| | | | |
|---|---|---|---|
| 4,621,334 A | 11/1986 | Garcia | |
| 4,805,222 A | 2/1989 | Young et al. | |
| 5,343,529 A | 8/1994 | Goldfine et al. | |
| 5,386,103 A | 1/1995 | DeBan et al. | |
| 5,870,723 A | 2/1999 | Pare, Jr. et al. | |
| 5,974,162 A | 10/1999 | Metz et al. | |
| 6,006,188 A | 12/1999 | Bogdashevsky et al. | |
| 6,012,052 A * | 1/2000 | Altschuler et al. | 1/1 |
| 6,151,593 A | 11/2000 | Cho et al. | |

(Continued)

FOREIGN PATENT DOCUMENTS

EP         1255392         11/2002

OTHER PUBLICATIONS

Obaidat, M. S. and Sadoun, B. "Keystroke Dynamics Based Authentication" in Biometrics: Personal Identification in Networked Society, Anil Jain et al., editors, Kluwer, MA. (1998).

(Continued)

*Primary Examiner* — Gilberto Barron, Jr.
*Assistant Examiner* — Abdulhakim Nobahar
(74) *Attorney, Agent, or Firm* — Tsircou Law, P.C.

(57) ABSTRACT

This invention discloses a system wherein behaviormetrics are utilized to authenticate electronic transactions, either alone or in combination with other identifiers such as PIN's, passwords, codes and the like. Probability profiles or probability distribution representations may be constructed for determining whether a purported or alleged authorized user is in fact the authorized user, by comparing new data on a real-time basis against probability distribution representations including an authorized user probability distribution representation and a global or wide population probability distribution representation, to provide a probability as to whether the purported authorized user is the authorized user. This invention may utilize keypad, touch screen dynamics, X-Y dynamics, data, X-Y device data, or other data from similar measurable characteristics (such as movement filmed by an ATM machine), to determine the probability that the new data from the purported authorized user indicates or identifies that user as the authorized user.

20 Claims, 12 Drawing Sheets

U.S. PATENT DOCUMENTS

| | | | |
|---|---|---|---|
| 6,173,260 B1 | 1/2001 | Slaney | |
| 6,298,348 B1 | 10/2001 | Eldering | |
| 6,311,272 B1 | 10/2001 | Gressel | |
| 6,429,927 B1 | 8/2002 | Borza | |
| 6,442,692 B1 | 8/2002 | Zilberman | |
| 6,487,662 B1 | 11/2002 | Kharon et al. | |
| 6,553,494 B1 | 4/2003 | Glass | |
| 6,810,480 B1 | 10/2004 | Parker et al. | |
| 6,938,159 B1 | 8/2005 | O'Connor et al. | |
| 6,957,185 B1 | 10/2005 | Labaton et al. | |
| 6,983,061 B2 | 1/2006 | Ikegami et al. | |
| 7,130,452 B2 | 10/2006 | Bolle et al. | |
| 7,133,792 B2 | 11/2006 | Murakami et al. | |
| 7,206,938 B2 | 4/2007 | Bender et al. | |
| 7,245,218 B2 | 7/2007 | Ikehara et al. | |
| 7,249,263 B2 | 7/2007 | Chaudhari et al. | |
| 7,327,859 B1 | 2/2008 | Chau | |
| 7,370,208 B2 | 5/2008 | Levin et al. | |
| 7,441,123 B2 | 10/2008 | Grant et al. | |
| 7,494,061 B2 | 2/2009 | Reinhold | |
| 7,509,686 B2 | 3/2009 | Checco | |
| 7,565,548 B2 | 7/2009 | Fiske et al. | |
| 7,747,044 B2 | 6/2010 | Baker et al. | |
| 7,818,290 B2 | 10/2010 | Davis et al. | |
| 2001/0004733 A1 | 6/2001 | Eldering | |
| 2002/0095586 A1 | 7/2002 | Doyle et al. | |
| 2002/0112171 A1 | 8/2002 | Ginter et al. | |
| 2002/0129368 A1 | 9/2002 | Schlack et al. | |
| 2002/0174347 A1 | 11/2002 | Ting | |
| 2003/0051147 A1 | 3/2003 | Maeda et al. | |
| 2003/0065595 A1 | 4/2003 | Anglum | |
| 2003/0074201 A1 | 4/2003 | Grashey et al. | |
| 2004/0015714 A1 | 1/2004 | Abraham et al. | |
| 2004/0034558 A1 | 2/2004 | Eskandari | |
| 2005/0008148 A1 | 1/2005 | Jacobson | |
| 2006/0104484 A1 | 5/2006 | Bolle et al. | |
| 2006/0104486 A1 | 5/2006 | Le Saint et al. | |
| 2006/0195328 A1 | 8/2006 | Abraham et al. | |
| 2006/0206724 A1 | 9/2006 | Schaufele et al. | |
| 2006/0224898 A1 | 10/2006 | Ahmed | |
| 2006/0288234 A1 | 12/2006 | Azar et al. | |
| 2007/0005988 A1* | 1/2007 | Zhang et al. | 713/186 |
| 2007/0011039 A1 | 1/2007 | Oddo | |
| 2007/0036395 A1 | 2/2007 | Okun | |
| 2007/0174633 A1* | 7/2007 | Draper et al. | 713/186 |
| 2007/0245157 A1 | 10/2007 | Giobbi et al. | |
| 2007/0283416 A1 | 12/2007 | Renaud | |
| 2008/0104415 A1 | 5/2008 | Palti-Wasserman et al. | |

OTHER PUBLICATIONS

Lu, X.; Chen H.; and Jain A. K., "Multimodal Facial Gender and Ethnicity Identification," Advances in Biometrics; International Conference, Hong Kong, China (2006), pp. 554-561.

Monrose, F. et al., "Password Hardening Based on Keystroke Dynamics," Proceeding of sixth ACM Conference on Computer and Communications Security, CCCS (1999).

"SecurID Token", http://www.is.mcgill.ca/minerva/Security/securid_token.htm. (Jun. 3, 2003).

"Baye's Theorem—Wikipedia", http://web.archive.orglweb/20031204023001/http://en.wikipedia.orglwikilBayes' theorem.

Bandi, K.R. and Srihari, S.N. "Writer Demographic Classification Using Bagging and Boosting", Proc. International Graphonomics Society Conference (IGS), Jun. 2005, Salerno, Italy, pp. 133-137.

Body for Electronic Signatures Uniform Electronic Transactions Act (UETA), 1999.

Cottrell, G.W. and Metcalfe, J. "EMPATH: Face, Emotion, and Gender Recognition using Holons", Proc. 1990 Conf. Advances Neural Information Processing Systems, 1990, Denver, Colorado, pp. 564-571.

Golomb, B.A.; Lawrence, D.T.; and Sejnowski, T.J. "SexNet: A Neural Network Identifies Sex from Human Faces", Proc. 1990 Conf. Advances Neural Information Processing Systems, 1990, Denver, Colorado, pp. 572-577.

Gunetti, D. et al.; "Keystroke Analysis of Free Text" ACM Transactions on Nformation and System Security, vol. 8, Aug. 2005, pp. 312-347.

Han, J.Y.; "Low-Cost Multi-Touch Sensing through Frustrated Total Internal Reflection" UIST '05, Oct. 2005, Seattle, ACM, pp. 115-118.

Henniger, O.; Schneider, B.; Struif, B.; and Waldmann, U. "Improving the Binding of Electronic Signatures to the Signer by Biometric Authentication", Advances in Biometrics: International Conference, Hong Kong, China, 2006, pp. 523-530.

Lu, X.; Chen, H.; and Jain, A. K. "Multimodal Facial Gender and Ethnicity Identification", Advances in Biometrics: International Conference, Hong Kong, China, 2006, pp. 554-561.

Pusara, M. and Brodley, C.E., "User ReAuthentication via Mouse Movements" In Proceedings of the 2004 ACM Workshop on Visualization and Data Mining for Computer Security, ACM, New York, NY, pp. 1-8.

Sato, Y. and Kogure, K. "On-line Signature Verification. Based on Shape, Motion, and Writing Pressure", Proc. 6th Int. Conf. on Pattern Recognition, pp. 823-826, 1982.

The Electronic Signatures in Global and National Commerce Act (ESIGN, Pub.L. 106-229, 14 Stat. 464, enacted Jun. 30, 2000, 15 U.S.C. ch.96), 2001.

Yun, M.H, et al. "Classification of Bluffing Behavior and Affective Attitude from Prefrontal Surface Encephalogram During On-Line Game" Advances in Biometrics: International Conference, Hong Kong, China, 2006, pp. 562-570.

Zhang, S. et al.; "Continuous Verification Using Mutlimodal Biometrics" Advances in Biometrics: International Conference, Hong Kong, China, 2006, pp. 562-570.

* cited by examiner

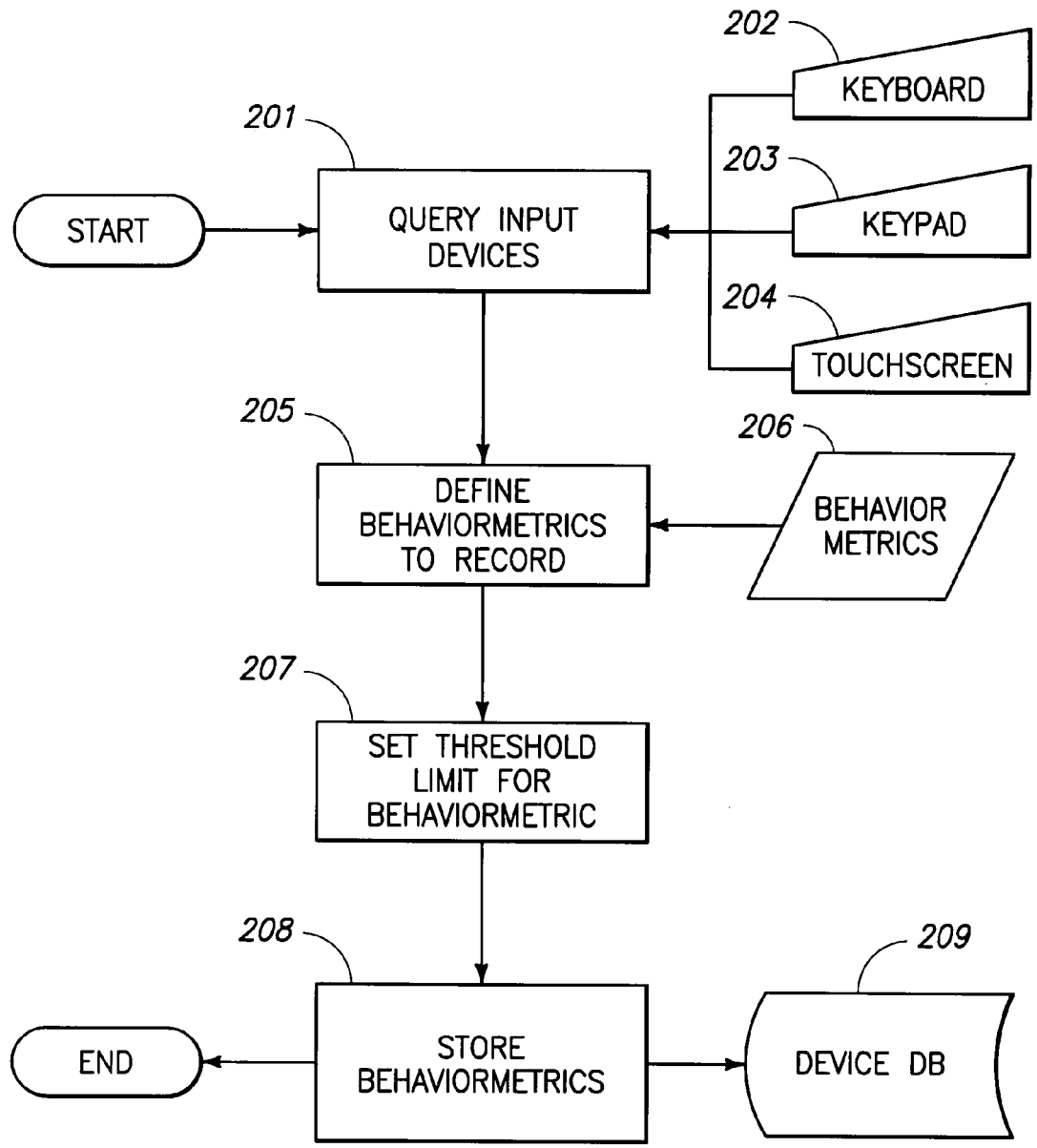

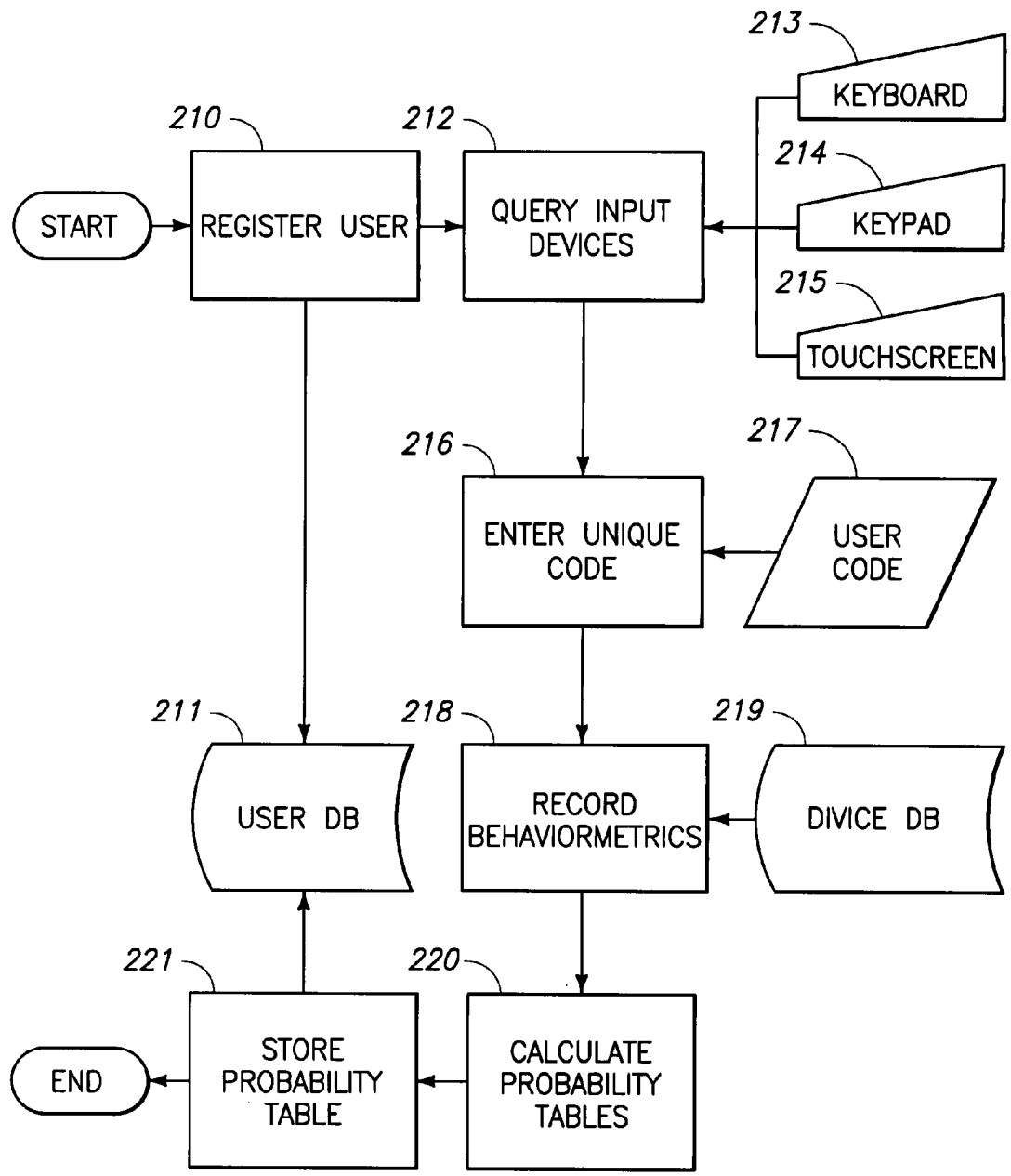

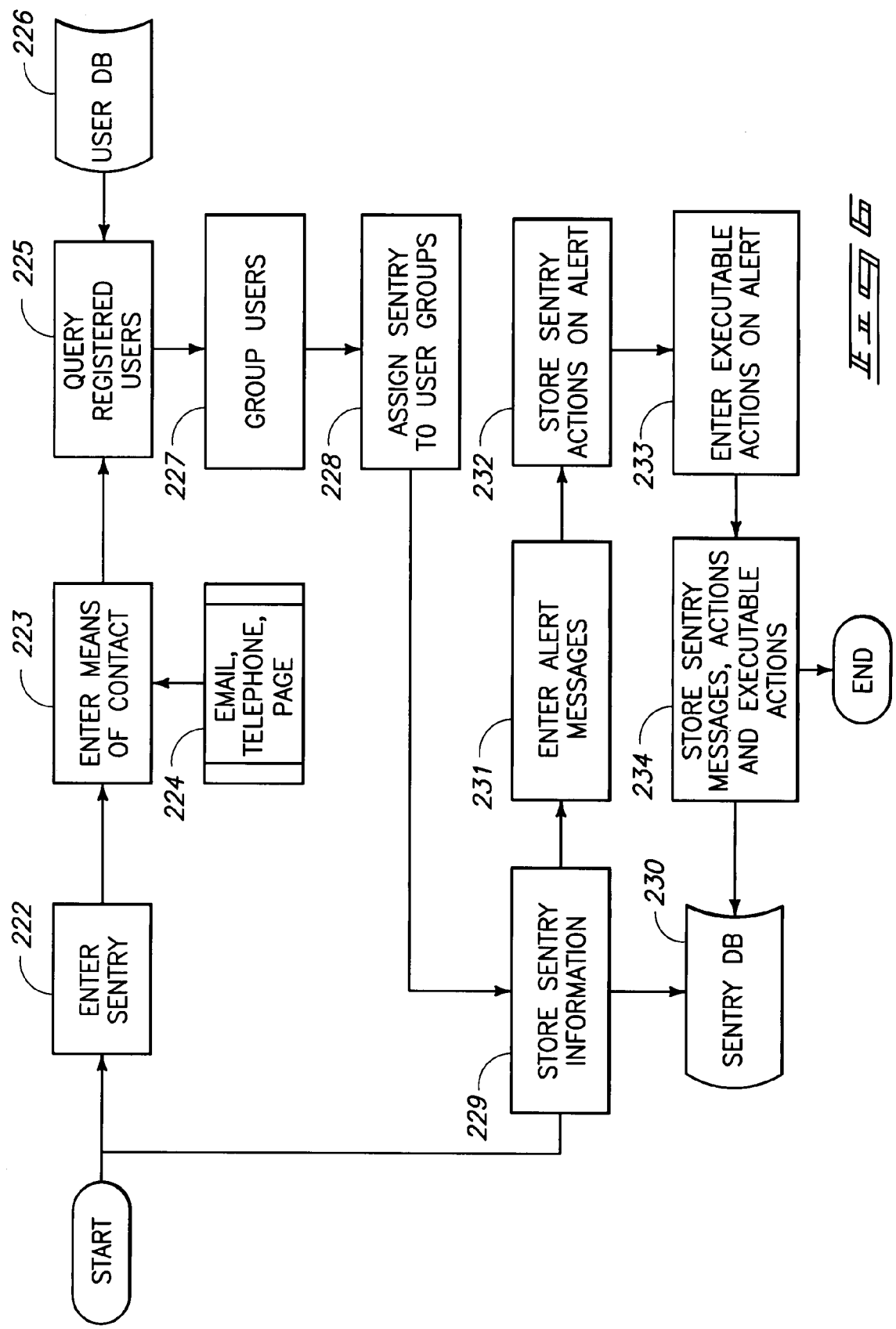

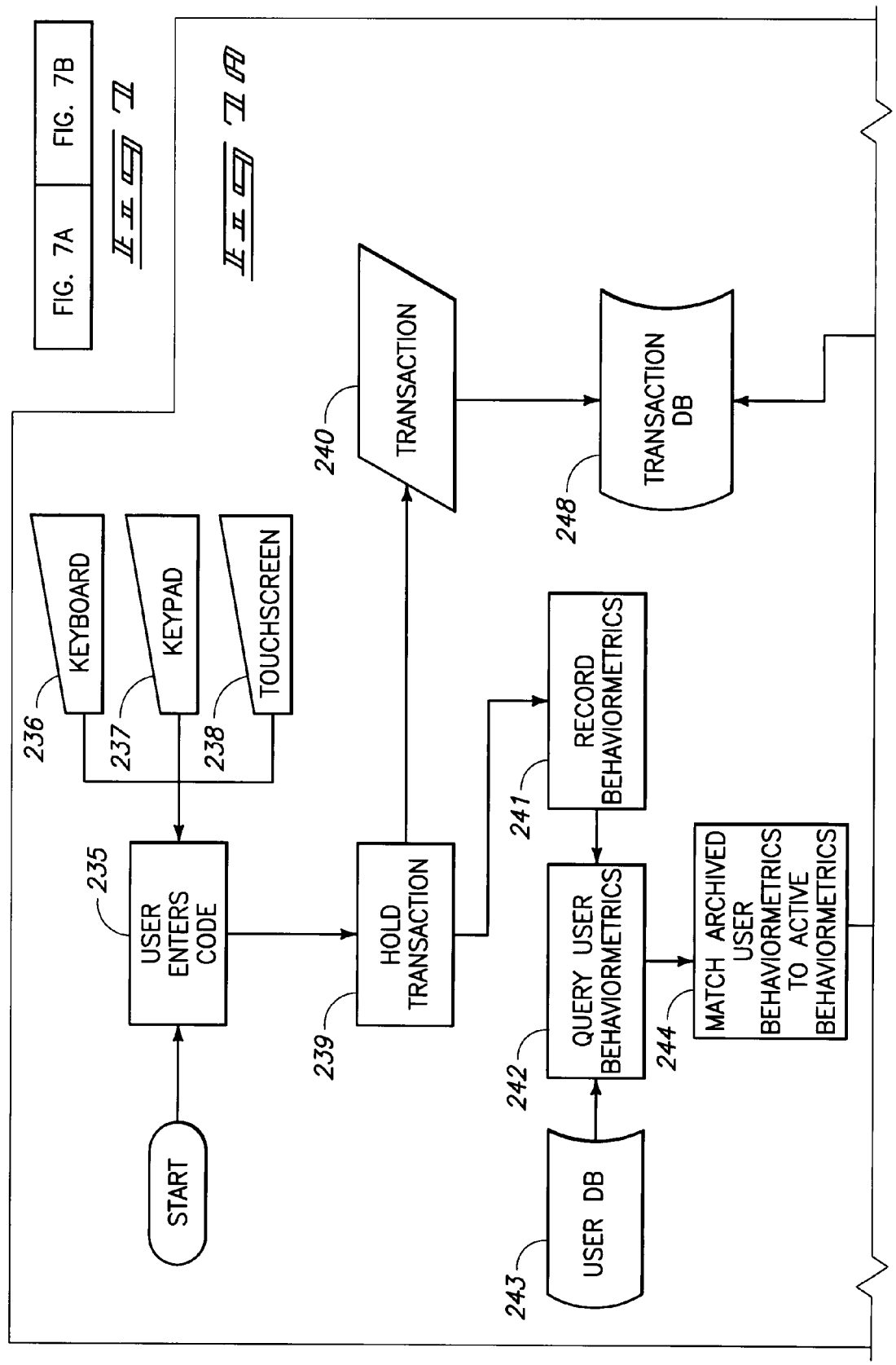

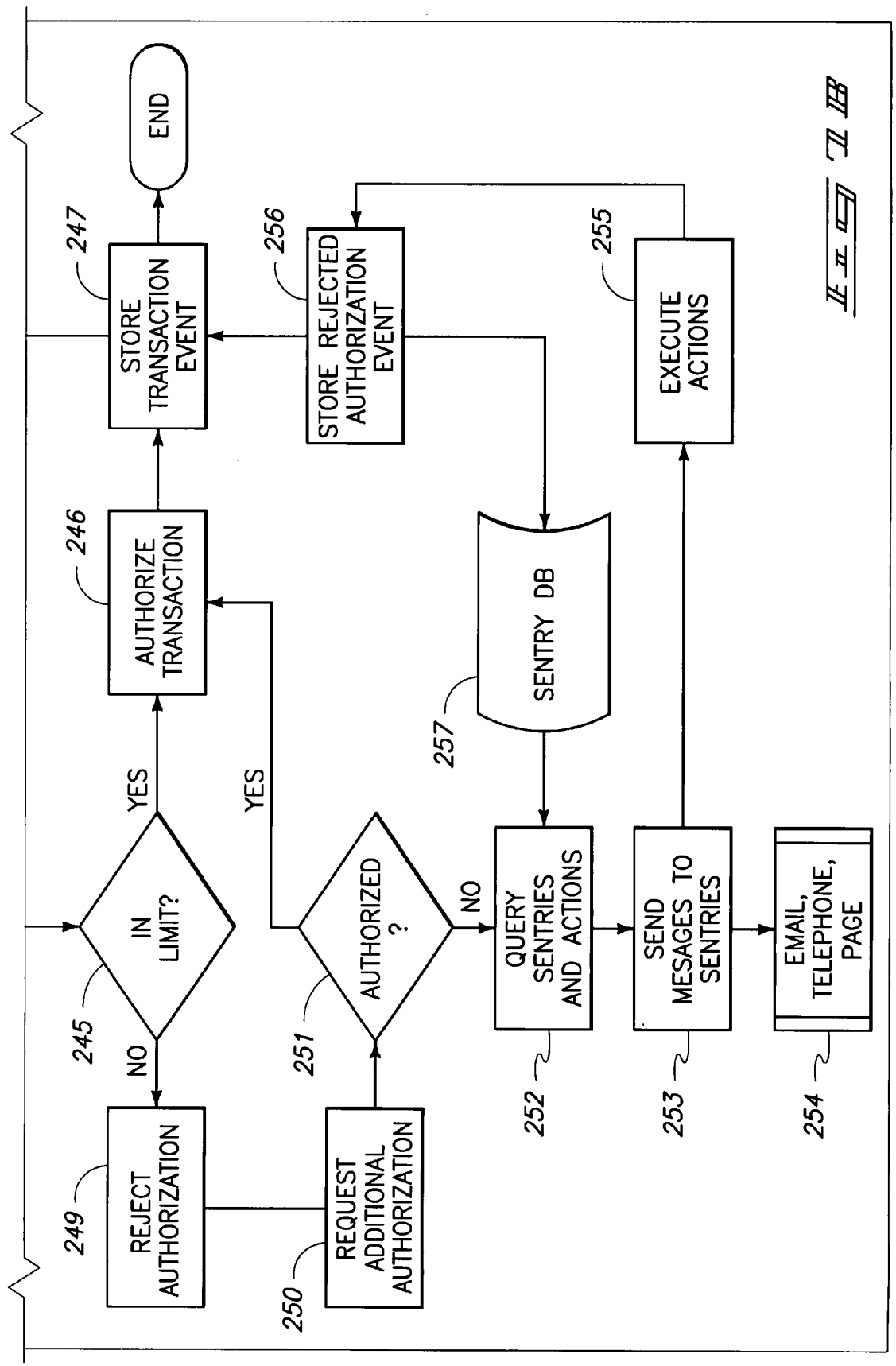

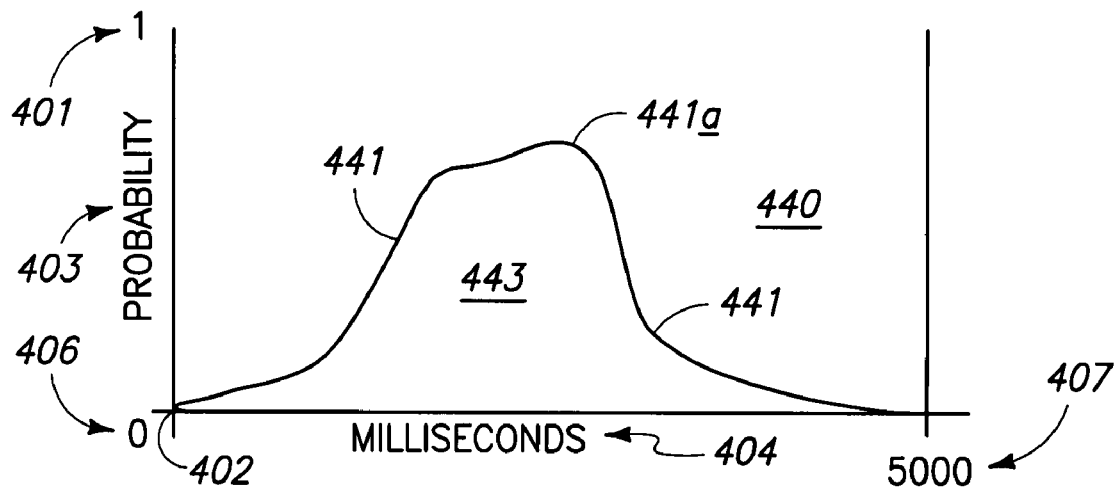
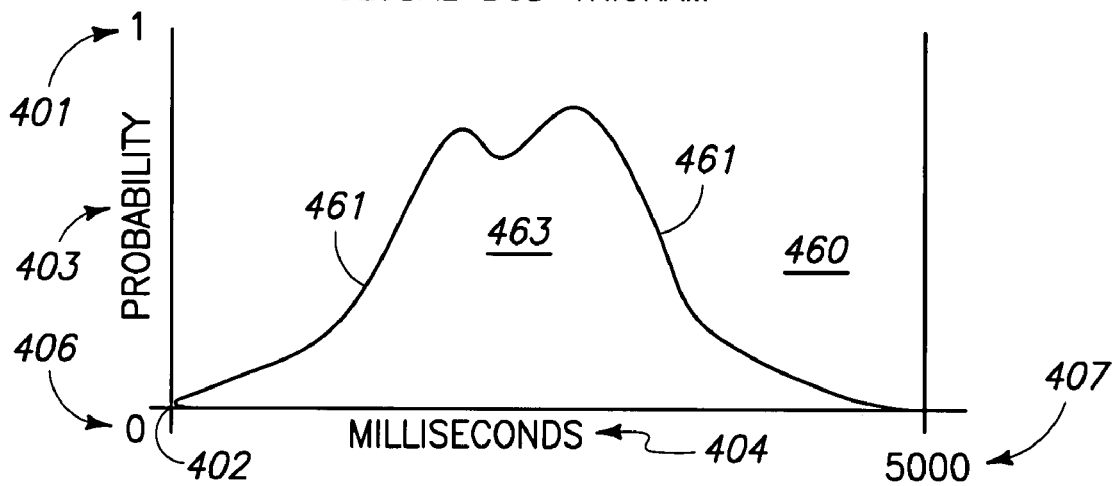

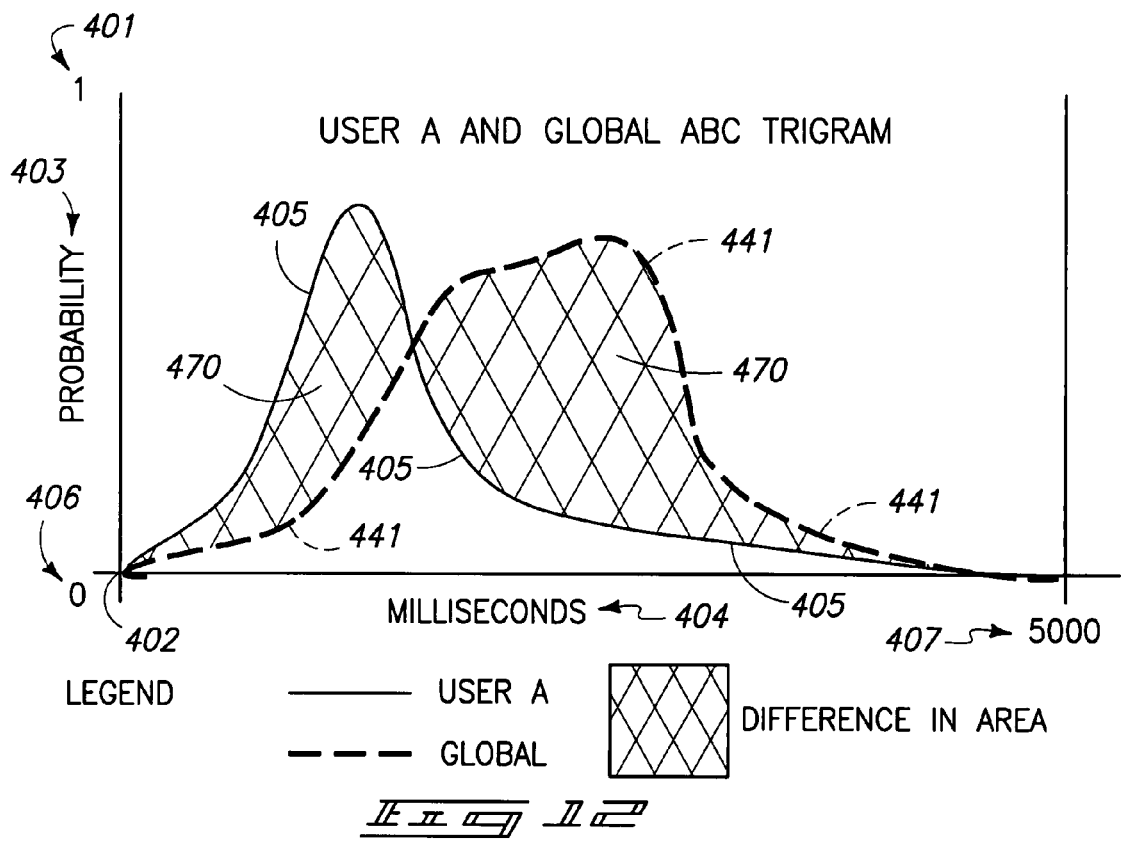
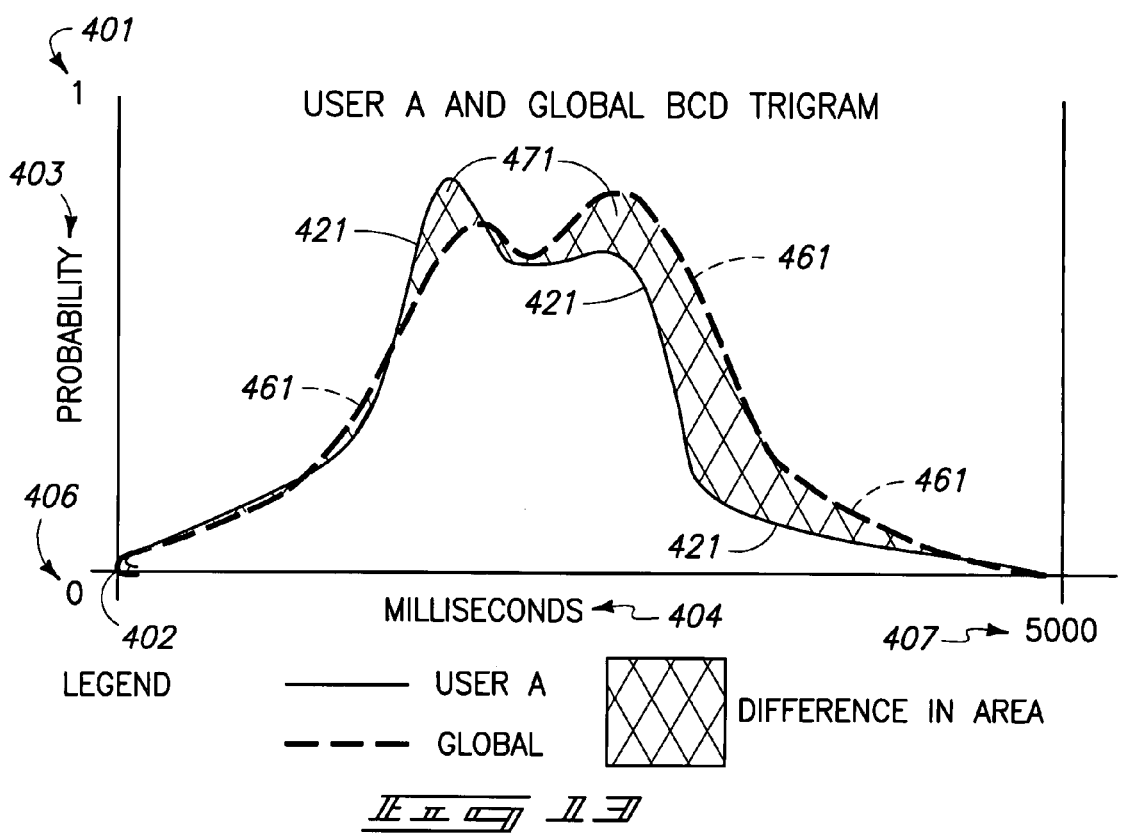

BEHAVIORMETRICS APPLICATION SYSTEM FOR ELECTRONIC TRANSACTION AUTHORIZATION

CROSS REFERENCE TO RELATED APPLICATION

This application claims priority from the following applications: (1) U.S. provisional patent application No. 60/819,946, filed Jul. 11, 2006, confirmation number 9053, entitled "The Application of Behaviormetrics for the Authorization of Electronic Transactions", by inventors Timothy Erickson Meehan, Richland, Wash., and Herbert Lewis Alward, Coeur d'Alene, Id. The above-referenced U.S. provisional patent application is hereby incorporated herein by this reference as though fully set forth herein, including specification and drawings.

TECHNICAL FIELD

This invention relates generally to behaviormetrics in providing a behaviormetric based unique signature of a user in authenticating a user input in connection with a financial or other transaction when a user is employing a system input device.

BACKGROUND OF THE INVENTION

Today most business transactions or part of the transaction is performed electronically. A potentially vulnerable and complicated aspect of processing and/or performing an electronic transaction is to identify the user electronically as the authorized user. To authenticate the originator of an electronic transaction, many devices use input terminals as authenticating user interfaces into a business system with one of the most common being a credit card transaction. To identify the user at automated teller machines (ATM), the user typically employs a touch screen device to key in their personal identification number (PIN) in conjunction with a swipe card entered into the machine. In this manner both the swipe card and the PIN work in conjunction to authenticate the user at the terminal. These are just two of many examples of how authorizations may be accomplished to guarantee the authenticity of the owner of the transaction.

A sufficiently high level of security has not been achieved despite the long sought need and motivation to try. Credit cards, debit cards, and bank cards for instance, are still relatively vulnerable to theft, which puts the owner vulnerable to financial theft. Further, when passwords are used in conjunction with cards, other and additional vulnerabilities may be introduced into the transactions, such as the poor choice of a user-defined password, stolen passwords, lost passwords or the situations in which the user exposes the password to an unauthorized party. Handwritten signatures of the users are often used in credit cards transactions, but they are vulnerable to manual and electronic copying.

The industry has long recognized the need to try to reduce the level of risk or vulnerability which is inherent in secondary devices such as biometric devices: fingerprint and retinal scanners, etc, thus requiring the user to authenticate via redundant and varied means. However, these methods tend to be onerous and intrusive to the user and non-adaptive to any changes in the biometric signature. These prior attempts teach away from this invention.

A less intrusive and more adaptable means of recording an identifiable signature of the user is to monitor or additionally monitor the behaviormetrics of the user at the input terminal. Behaviormetrics may for example pertain to how the user interacts with the input terminal, or acts or reacts while being observed by a camera or photo image device at or near the input terminal. The observed behaviors that may be observed and/or recorded may for example include the rhythm or timing of typing or input entry, the pressure applied during input, the location on the terminal where input is made, etc.

Behaviormetrics can be monitored and applied at any input terminal including keypads, mouse devices, touch screens, pen or stylus devices, etc. It is the statistical behavior of use that has been shown to be unique and identifiable for each user.

In an exemplary scenario in which an unauthorized party gains initial access under an authorized user's identity, the behaviormetrics of the unauthorized party exposes them as a different person. Prior art focused on keystroke dynamics as the identifying behavior of the user but a host of input devices are at the general disposal of lay users. A shortcoming of some of the prior art is that no adaptive mechanism has been established for the changes in the keystroke behavior or changes in any biometric pattern. The prior art also uses techniques to authenticate the user that are computationally intensive on a large scale and therefore are less scalable than this invention, especially as utilized over such mediums as the world wide web or internet.

Many devices and systems use a keypad, keyboard or similar terminal as a user interface to access the device or system. Keyboard terminals are generally hardware devices or user interfaces that emulate typewriters, but they are also keypads on cellular telephones, portable devices such as PDA's and touch screen devices, tablet computers, or other devices that use a touch screen for key entry. These types of devices with the user interfaces may for example be a computer or electronic machine that generally requires any type of input such as alphanumeric input, but keyboards are not restricted to having alphanumeric keys.

At the keypad, ATM, or keyboard for example, statistical dynamics of the keyboard typing/entry are unique to the user, with some dynamics more unique or indicative of that user than others. Therefore, the dynamics of the authorized user's use of the input device, provide a way of identifying a probability that the purported authorized user is in fact the authorized user. This dynamic use unique to or indicative of a particular person may also be referred to as a statistical signature of the authorized user at the human device interface. The ongoing dynamic use of the user interface such as the keypad, touch screen or X-Y device provides real time, continuous data which may be utilized to authenticate the user.

In either case, the attempted unauthorized access may be identified in a real time, continuous fashion, by embodiments of this invention. Prior art focused on the timing of the keystrokes as the identifying behavior of the user.

Identifying and knowing the user of a card or other input in a financial transaction is a very desirable aspect of financial transactions, especially remote financial transactions, for security and other reasons. The financial transaction input device, keypad, ATM or other, may preferably accurately define the current user of said computer or software application.

This invention provides for the authentication of a user via the input behavior of the authorized user, such as by keypad, touch screen, keyboard, or by the X-Y device movement or dynamics of the authorized user. Unlike other biometric devices, it is non-intrusive and adaptable to changes in the user's behavior. The keypad, touch screen, keyboard dynamics and/or X-Y device dynamics system provided by this invention is relatively scalable through the use of probability distribution representations, which in some examples or embodiments, may provide scales relative to O(1) number of users in calculating the likelihood the user is the authorized user. Other implementations scale to n or $n^2$ number of users. Embodiments of this invention may also provide a means to notify security sentries and execute programmed actions upon a breach in security based on the keyboard dynamics.

Embodiments of this invention provide for the authentication of a user via the behaviormetrics behavior of the user at the input device as a means of a signature to authorize electronic transactions. Unlike other biometric devices, embodiments of this invention may be non-intrusive and adaptable to changes in the user's behavior. These embodiments of this invention also do not require any additional hardware, since the behaviormetrics can be recorded on existing hardware interfaces. Unlike other implementations of behaviormetrics embodiments of this invention are scalable through the use of probability tables, which scale relative to O(1) number of users in calculating the likelihood the user is the legitimate user. Other implementations scale to n or $n^2$ number of users. This invention also provides a means to notify security sentries and executive programmed actions upon a breach in security based on the keyboard dynamics.

An object of some embodiments of this invention is to provide a user authentication or identification system using data related to mouse dynamics to determine if it is probable that the data is indicative that the purported authorized user is actually the authorized user, based on the chosen data characteristic (which in some aspects of the invention may be like a signature) for the authorized user.

Probability distribution representations may be used in embodiments of this invention to identify if the purported or alleged authorized user or participant in the financial transaction is in fact the authorized user. Calculation and/or algorithms may be utilized to calculate the likelihood the alleged authorized user is the legitimate authorized user who has been authorized to access the system, account or device. The probability distribution representations provide a fast, adaptable and scalable mechanism for discerning legitimate users from illegitimate users. Embodiments of this invention may also provide a system to provide security alerts to, or notify, sentries when the system determines that it may be probable that the new or purported authorized user may not in fact be the authorized user. In some aspects of this invention, the security notification mechanism may provide a more proactive notification and security system to better secure the system to which it is being applied.

It is an object of some embodiments of this invention to provide a system for determining which of a plurality of identifying data points provide better identification of an authorized user, user group or class of users.

While the invention was motivated in addressing some objectives, it is in no way so limited. The invention is only limited by the accompanying claims as literally worded, without interpretative or other limiting reference to the specification, and in accordance with the doctrine of equivalents.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

FIG. 4 is a exemplary flowchart illustrating one embodiment of this invention, wherein a sequence of logical steps are shown which may be employed to define and store the behaviormetrics to be recorded and stored for an input device;

FIG. 5 is an exemplary flowchart illustrating an embodiment of this invention, wherein the sequence of logical steps may be employed to monitor and store the behaviormetrics of a user for a specified input device;

FIGS. 6 & 7 are an exemplary flowchart illustrating an embodiment of this invention, wherein the sequence of logical steps employed to configure a system to compare a current user against an archived user, store the transactions, notify the proper sentries when a discrepancy occurs and take corrective actions;

FIG. 10 is a graphic representation of one embodiment of a probability distribution representation for keystroke timings of a wide population demographic user group typing keystrokes for the key combination of ABC;

FIG. 11 is a graphic representation of one embodiment of a probability distribution representation for keystroke timings of a wide population demographic user group typing keystrokes for the key combination of BCD;

FIG. 12 is a graphic representation of one embodiment of a probability distribution representation for a user typing the keystrokes ABC illustrated in FIG. 8, overlaid on the embodiment of the probability distribution representation for keystroke timings of a wide population demographic user group typing keystrokes ABC illustrated in FIG. 10;

FIG. 13 is a graphic representation of one embodiment of a probability distribution representation for a user typing the keystrokes BCD illustrated in FIG. 9, overlaid on the embodiment of the probability distribution representation for keystroke timings of a wide population demographic user group typing keystrokes BCD illustrated in FIG. 11;

DETAILED DESCRIPTION OF THE PREFERRED EMBODIMENTS

Figure 1:
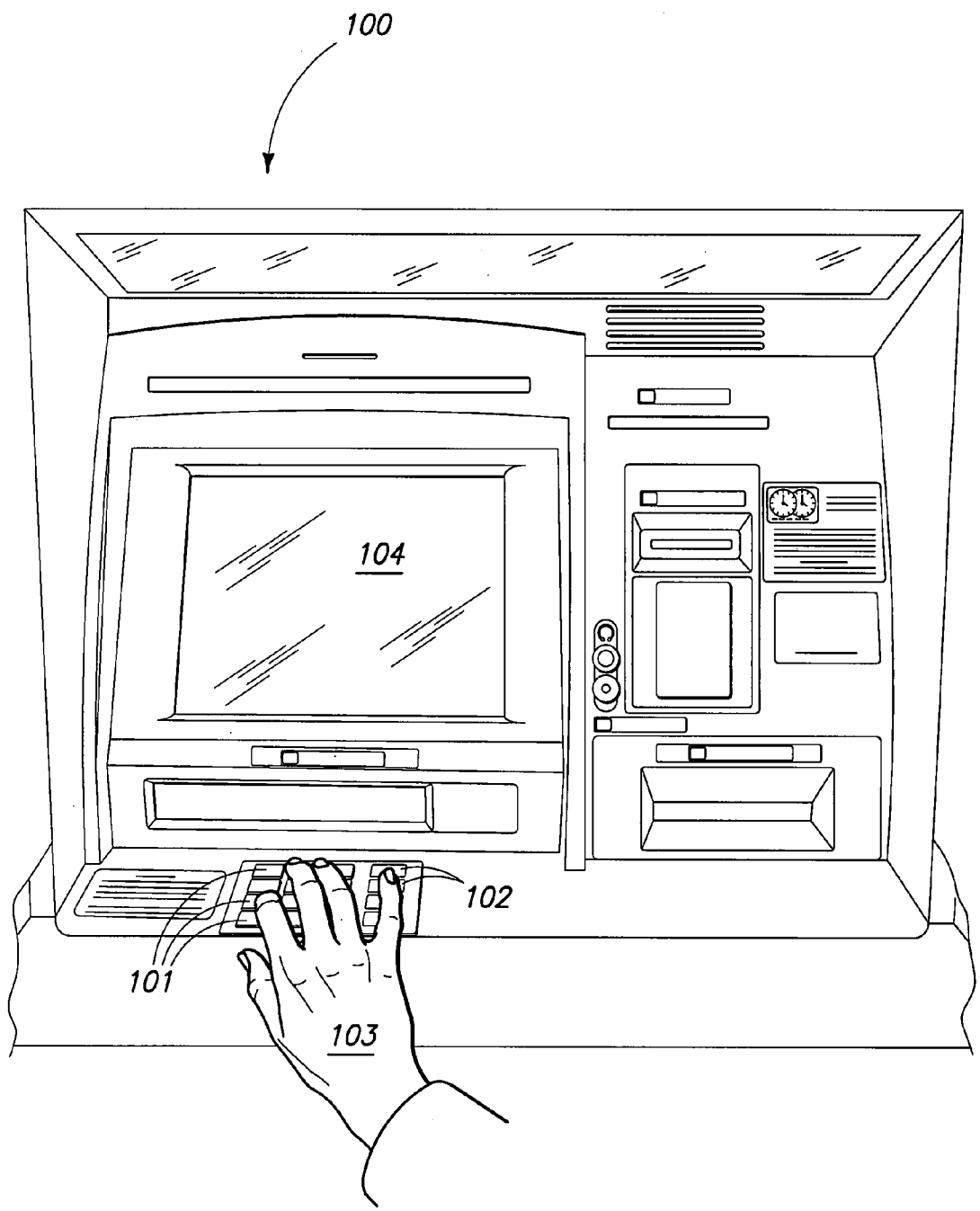
FIG. 1 is a perspective view of a user utilizing a typical automated teller machine, utilizing a keypad.

The term "data" as used herein may be any individual or group of data, data points or items, from any one of a number of sources and may be any one of a number of different types of data. Data for example may be a sensed data or grouping of individual data points, or a measurement of most anything that can be measured, preferably related to behavior or distinguishing characteristics. Some examples of data may include information, parameters, keystroke dynamics, X-Y device dynamics, events, characteristics, facial movement, eye movement, facial profile, data points, groups of data points or characteristics, inputs, signals, etc.

When the term "accessing" is used in connection with accessing data or accessing characteristics or accessing other items, it is not limited to accessing data or information from outside the processor, but instead would include all such items accessed within the data processing apparatus or system, or from sources external to the processor.

It will also be appreciated by those of ordinary skill in the art that data may also be a grouping or combination of any of the foregoing. As one example, data points from keystroke dynamics from a user typing keys and keyboard or key-based interface, the timing of keying of keystrokes or keystroke combinations, may be measured for example for a series of keystrokes such as typing the keys ABC or BCD.

In some aspects of this invention, data is obtained by taking measurements from an X-Y device, for example measuring the speed at which a user moves on a touch screen input device for a financial transaction, or the location area where a user tends to remain at rest on the X-Y device, or the trajectory which the user tends to follow in moving a computer mouse (or the user's finger on a touchpad input device to electronic system, or on a tablet computer). Another example may be wherein data such as the pressure which a user asserts on a tablet computer user interface (e.g. a screen), which in some examples includes sensing pressure on a scale of zero to fifty-six.

The phrase "probability distribution representation" may be a behavioral record which may, but need not be, related to frequency of an identified behavior, component of behavior, measurement of behavior or other data point. It will be recognized by those of ordinary skill in the art that these tables may come in numerous shapes, forms, configurations, scales and may include singular measurements, groupings of measurements, groupings of data, or any other individual data points or items, which may provide identifying information for comparison, or for distinguishing a particular identified or authorized user. Examples of probability distribution representations may be probability tables, histograms, bar graphs, frequency records, event counts, profiles, records, lookup tables, probability lookup tables, behavioral profiles, bar graphs, distribution functions, or others, all within the contemplation of this invention. There may be different ways to visually represent a probability distribution representation, such as more as a bar chart, curve, smoothed curve, series of data points represented graphically, a histogram or others, with no one in particular being required to practice this invention. Known techniques may be utilized to create or smooth or alter the curve and/or data representation.

When the term "authentication" is used herein it may be broader than its traditional definition in that it may refer at least in part to identify, identification, authorizing, authenticating, labeling, associating, or fingerprinting the data to an identified or authorized user for any one of a number of different purposes. Examples of purposes for which authentication is desired may be authenticating that the person possessing a password and entering into an online account is the person or authorized user whose profile is recorded and the person that is authorized to enter that contract. For instance if keystroke dynamics or keystroke data provides the measurable or ascertainable data, then a comparison of the users keystroke dynamics to the probability distribution representations for that user in the global probability distribution representations for that keystroke dynamic would be compared in order to verify a probability that the purported or alleged authorized user is the identified user or authorized user.

When the term or phrase "authorized user" is used herein, it means not only a single user, but may also include a class, group or demographic of users all within the meaning of the phrase "identified user". For example, it may include persons within an accounting group at a corporation who have access to a computer or electronic system or network; or it may include a group of people classified together because they are all left-handed, wherein this invention is not limited to any one in particular.

The term "global" in relation to a probability distribution reference or references may also be referred to as a wide population reference, for which there is no particular number or quantity of data points blended, but which will depend upon the circumstances. In most if not all cases the wide population data will include more than a sample of one since the one data point would be from the current purported authorized user.

Embodiments of this invention are methods and apparatus configured to receive, which may in some examples mean a system is configured to receive, collect, capture, sense or parse data, and then to process or utilize said data as further described herein.

Embodiments of this invention may provide a desired advantage of being more scalable than other systems, in that substantial or even massive amounts of data, characteristics, information or other measurable input data may be incorporated into one or more probability distribution representations or histograms to provide a single or a small number of probability distribution representations against which to compare the new information with. This means that massive information such as gathered over the World Wide Web or Internet may be distilled into one or relatively few probability distribution representations against which the data can be quickly compared to determine if it is more probable than not that the purported authorized user, is in fact the authorized user. The system designer adapting embodiments of this invention to a given application will have many options in determining what type of probability distribution representation to construct, the data to best distinguish the distinguishing characteristic, and further in defining the universe of data that may be combined to comprise the probability distribution representation, to optimize the ability to distinguish a user, or to authenticate the authorized user.

Embodiments of this invention may but need not necessarily include an adaptive, scalable method to acquire a behavioral signature for a user of a system who utilizes a keyboard. These embodiments of this invention may for instance accomplish this by tracking a pattern of keyboard dynamics made by the user. This keyboard dynamic pattern becomes a signature for the user and can be used to determine if the user at the keyboard is the same user registered as the current user via other electronic means such as a password or smart card, etc. The system defines the means to record the pattern, track the users at the keyboard terminal and notify proper authorities when the user at the keyboard is determined to be different than the user who is registered as the active user at the keyboard.

As fingerprints identify individual people, so does certain keyboard dynamic or other data identify an individual. Keyboard devices may render an identifiable signature related to the typing of the keys. This data or characteristics of use may be used in similar fashion, such as utilizing the pattern with which the user interfaces with or used the keyboard or parts thereof. This may in one example consist of measuring the hold time of keys and/or the timing of the keystrokes. The pattern of certain keystrokes may be sufficiently individualistic or unique to each individual due to any one of a number of different factors, such as for example the relationship between the timing of keystrokes between keys and to the length of their arms, fingers, size of arm and finger strength, as well as familiarity with the keyboard. For another example, users may have different timing between keys "a" and "x" on a Standard English keyboard. The set of the differences between the keys may yield a set of keystroke relationships for determining the probability that a particular user is at a keyboard. The pattern of timing between the keys may then become a unique identifier or signature of sorts, of the user.

Embodiments of the present invention may define an adaptive, scalable method to acquire a behavioral signature by recording the behaviormetrics defined for an input device of a system that performs electronic transactions. This behaviormetric pattern alone or in combination with other indicators, become a signature for the user to authorize electronic transactions or prevent unauthorized transactions. This invention defines the means to record the behaviormetrics, record and compare the user behavior metrics at the input terminal and notify proper authorities when the user at the input terminal is determined to be different than the authorized user.

Embodiments of this invention may therefore include the establishment of measurements and places probability profiles on the behaviormetrics of any chosen n-gram measurement. The measurements may pertain to and are not restricted to the hold time of a keystroke, the timing between keystrokes, or the total time to produce an n-gram measurement of keystrokes. The n-gram measurement can be a single key, two keys to n keys to acquire the measurement. For example, a trigraph would capture sets of three keys to determine the measurement.

It will also be noted that a behaviormetric for a given user of an electronic transaction system may include without limitation, recordable movements of the purported authorized user as monitored by a camera at an ATM location for example, as well as the behaviormetrics of the purported authorized user interacting with or operating the electronic transaction input device, all within the contemplation of this invention.

To establish the probability profile of a user, the system captures the keyboard events and the frequency of the keyboard events produced by the user and stores the results. Table 1 illustrates an example event table for a trigraph. The system stores the three successive keys as a timing event in milliseconds and the corresponding frequency of occurrence. These measurements then yield a user profile.

TABLE 1

Trigraph user timing events of keystroke collections.

| User A Trigraph | Time (milliseconds) | | | | | | | |
|---|---|---|---|---|---|---|---|---|
| ABC | 0 | 100 | 101 | 102 | ... | 450 | ... | 5000 |
| frequency | 0 | 4 | 0 | 2 | ... | 50 | ... | 0 |
| BCD | 0 | 100 | 101 | 102 | ... | 320 | ... | 5000 |
| frequency | 0 | 2 | 1 | 5 | ... | 35 | ... | 0 |

Once the system sufficiently captures the user profile, the system calculates the user probability distribution representation by applying a general kernel function, $K_h(x)$, which smoothes the measured data into a density estimator, given by:

$$K_h(x) = 1/h\, K(x/h),$$

where h=bandwidth and
K=Uniform, Triangle, Quartic, Gaussian, Cosinus, or etc. kernel function.

The parameter, h, determines the smoothness of the estimation. When $h \to 0$, the kernel estimation is less smooth, and when $h \to \infty$, the kernel estimation is very smooth. The kernel function, K, can be any kernel estimation function where the $\int K(x)dx=1$. Table 2 illustrates the calculation of the likelihood for each keyboard event. Once trained for a user, when a keyboard event occurs, the system returns the likelihood value for that user.

TABLE 2

User Probability Distribution Representation.

| User A Trigraph | Time (milliseconds) | | | | | | | |
|---|---|---|---|---|---|---|---|---|
| ABC | 0 | 100 | 101 | 102 | ... | 450 | ... | 5000 |
| Likelihood | 0.00 | 0.02 | 0.01 | 0.01 | ... | 0.26 | ... | 0.00 |
| BCD | 0.00 | 100 | 101 | 102 | ... | 320 | ... | 5000 |
| Likelihood | 0.00 | 0.01 | 0.01 | 0.02 | ... | 0.20 | ... | 0.00 |

To make the probability distribution representation more adaptive, more parameters and training can be tied to the probability distribution representation, such as time of day or type of application. The size of the user probability needs only to be as large as the typing key space for the user. In the case of username/password typing behavior where no further authentication is considered, then the user probability distribution representation needs to contain only the n-gram measurements for the user's username/password set. In the case of continuous authentication of the user, then the user probability distribution representation needs to contain the entire set of possible n-gram measurements.

To establish the probability profile for an impostor, the system establishes a global probability distribution representation which stores the probability profile of the other users to determine the probability the typist is an impostor and not the alleged user. As done for the user probability distribution representation, the system captures the user's keyboard dynamics and stores the timing and frequency of events. The results are smoothed using a general kernel function to establish a kernel density estimator. The estimator calculates the likelihood that the typist belongs in the global set of users versus the user profile. As in Tables 1 and 2, similar tables are constructed for the global probability distribution representation as illustrated in Tables 3 and 4.

TABLE 3

Trigraph user timing events of keystroke collections for the global set of users.

| Global Trigraph | Time (milliseconds) | | | | | | | |
|---|---|---|---|---|---|---|---|---|
| ABC | 0 | 100 | 101 | 102 | ... | 400 | ... | 5000 |
| frequency | 0 | 1000 | 1200 | 900 | ... | 15000 | ... | 10 |
| BCD | 0 | 100 | 101 | 102 | ... | 380 | ... | 5000 |
| frequency | 0 | 700 | 400 | 1300 | ... | 12000 | ... | 17 |

TABLE 4

Global - Wide Population Probability Distribution Representation.

| Global Tri-graph | Time (milliseconds) | | | | | | | |
|---|---|---|---|---|---|---|---|---|
| ABC | 0 | 100 | 101 | 102 | ... | 400 | ... | 5000 |
| Likelihood | 0.00 | 0.05 | 0.06 | 0.05 | ... | 0.21 | ... | 0.00 |
| BCD | 0.00 | 100 | 101 | 102 | ... | 380 | ... | 5000 |
| Likelihood | 0.00 | 0.04 | 0.01 | 0.06 | ... | 0.18 | ... | 0.00 |

With both the user probability distribution representation and the global probability distribution representation, the system applies Bayes Rule to determine a posterior probability the observed user is the alleged user. The posterior probability that the observed user is the alleged user, $P(A|O)$, is given by:

$$P(A|O) = P(A)*L/((P(A)*L) + 1 - P(A)),$$

where $P(A)$ is the prior probability the user is the alleged user and $L$ is the likelihood ratio.

The likelihood ratio is given by $P(O|A)/P(O|I)$, where $P(O|A)$ is the probability the alleged user produced the observations and $P(O|I)$ is the probability an impostor produced the observations. Based on the threshold set for the value of $P(A|O)$, the system logs out the user or notifies a security sentry of a potential breach in security.

Determining the user signature via keyboard dynamics provides a means for establishing a system to monitor the identity of users throughout a network of electronic devices in real time. The system to monitor user identities stores the user keyboard dynamics patterns and compares the stored user keyboard dynamics with the registered user purported to be using the keyboard, thereby providing a probability the purported user is the authorized user. The sentries of the identities establish the lower limit of the probability they find acceptable for each user. Once the probability of an identity falls below this limit, the system notifies the sentries and executes any pre-defined actions that it can machine execute through automated scripts or software applications.

A means to identify a user is to track the user behavior of the X-Y device they are using, in this example what is commonly referred to as a computer mouse, or referred to as a mouse. A mouse for a computer is an input device that translates the position of a tracking ball to the position of the pointer on the computer display screen. A mouse may use a tracking ball or a light based location tracking mechanism, but other kinds of a mouse exist as touch pads, touch screens, pens, stylus, joysticks or such a device that yields an x,y or x,y,z coordinate on an electronic display screen. How the mouse is used and its placement is user specific due to the user's length of fingers, hands, arms and body position when using a mouse. When mouse activity occurs a user can be identified by comparing the current mouse activity to a stored mouse activity pattern associated with the user. This means of identifying the user then provides a real time signature of a user, thus allowing real time user identification at a computer workstation or software application.

Embodiments of this invention define a system which senses data for, or characteristics of, a user of a system, generally from that user's characteristic use of an input device or a user interface, such as an X-Y device (a mouse, touchpad, etc.) by tracking data or characteristics of the pattern of mouse dynamics made by the user. This mouse dynamic pattern may become like an identifying signature for the user and can be used to determine if there is a discrepancy between the purported user and the active user mouse dynamics. The system defines the means to record the mouse dynamics pattern, identify the active users using the mouse, and notify proper authorities when the mouse dynamics are determined to be different than the user who is registered as the active user.

The patterns of mouse dynamics created by a user are unique to the user due to the user's length of fingers, hand size, length of arm and position of the mouse. The method measures the pattern by recording the curser and mouse positions, the general resting positions of the cursor and the timing of the mouse movements and clicks. This unique pattern of mouse behavior becomes an identifiable signature for the user.

Determining the user signature via mouse dynamics provides a means for establishing a system to monitor the identity of users throughout a network of electronic devices in real time. The system to monitor user identities stores the user mouse dynamics patterns and compares the stored user mouse dynamics with the registered user purported to be using the mouse, thereby providing a probability the purported user is the authorized or identified user. The sentries of the identities establish the lower limit of the probability they find acceptable for each user. Once the probability of an identity falls below this limit, the system notifies the sentries and executes any pre-defined actions that it can machine execute through automated scripts or software applications.

To establish the probability profiles, n-gram measurements are made on the mouse dynamics. Table 5 is an exemplary n-gram table of measurements for recording the x,y resting position of the mouse, where (0,0) is considered to be the upper left corner of the terminal screen. The x,y values can represent the pixel value or any divided section of the terminal screen. Table 6 uses the measurement of speed along a chosen trajectory to record the unique mouse behaviormetrics, data or characteristics of the user.

TABLE 5

Recording the resting positions and durations of an X-Y Device Such as a touch screen, a signature screen with a modulus, or a mouse.

| User A Resting position | | | | | | | | |
|---|---|---|---|---|---|---|---|---|
| (0, 0) Time (seconds) | 0 | 10 | 11 | 12 | ... | 450 | ... | 3600 |
| frequency | 0 | 100 | 140 | 120 | ... | 4 | ... | 6 |
| (200, 200) Time (seconds) | 0 | 10 | 101 | 102 | ... | 320 | ... | 3600 |
| frequency | 0 | 200 | 250 | 180 | ... | 20 | ... | 2 |

TABLE 6

Recording the speed of the X-Y device movement across trajectories.

| User A Trajectory Vector | | | | | | | | |
|---|---|---|---|---|---|---|---|---|
| (0, 1) Speed (pixels/second) | 0 | 200 | 300 | 400 | ... | 1000 | ... | 2000 |
| frequency | 0 | 0 | 1 | 2 | | 47 | | 80 |
| (1, 1) Speed (pixels/second) | 0 | 200 | 300 | 400 | ... | 1000 | ... | 2000 |
| frequency | 0 | 0 | 0 | 0 | | 36 | | 175 |

Once the system sufficiently captures the user profile, the system calculates the user probability distribution representation by applying a general kernel function, $K_h(x)$, which smoothes the measured data into a density estimator, given by:

$$K_h(x)=1/h\ K(x/h),$$

where h=bandwidth and
K=Uniform, Triangle, Quartic, Gaussian, Cosinus, or etc. kernel function.

The parameter, h, determines the smoothness of the estimation. When $h \to 0$, the kernel estimation is less smooth, and when $h \to \infty$, the kernel estimation is very smooth. Once trained for a user, the system returns the likelihood value for that user. Table 7 illustrates the calculation of the likelihood for each mouse resting position event.

TABLE 7

User Probability Distribution Representation.

| User A Resting position | | | | | | | |
|---|---|---|---|---|---|---|---|
| (0, 0) Time (seconds) | 0 | 10 | 11 | 12 | ... 450 | ... | 3600 |
| Likelihood | 0 | 0.10 | 0.11 | 0.09 | ... 0.01 | ... | 0.01 |
| (200, 200) Time (seconds) | 0 | 10 | 101 | 102 | ... 320 | ... | 3600 |
| Likelihood | 0 | 0.20 | 0.22 | 0.19 | ... 0.01 | ... | 0.0 |

To make the probability distribution representation more adaptive, more parameters and training can be tied to the probability distribution representation, such as time of day or type of application. The size of the user probability needs only to be as large as the mouse action space for the user. In the case of continuous authentication of the user, then the user probability distribution representation needs to contain the entire set of possible n-gram measurements.

To establish the probability profile for an impostor or purported authorized user, embodiments of the invention may establish a global probability distribution representation which stores the probability profile of the other users to determine a probability that the purported authorized user is an impostor and not the authorized or alleged user. As done for the user probability distribution representation, the system captures the user's mouse dynamics and stores the timing and frequency of events. The results, if in curve format, may but need not be, smoothed using a general kernel function to establish a kernel density estimator. The estimator calculates the likelihood that the typist belongs in the global set of users versus the user profile. As in Tables 5, 6 and 7, similar tables are constructed for the global probability distribution representation as illustrated in Tables 9 and 4.

TABLE 8

Global record of resting positions and times of mouse.

| Global Resting position | | | | | | | |
|---|---|---|---|---|---|---|---|
| (0, 0) Time (seconds) | 0 | 10 | 11 | 12 | ... 450 | ... | 3600 |
| frequency | 0 | 100 | 140 | 120 | ... 4 | ... | 6 |
| (200, 200) Time (seconds) | 0 | 10 | 101 | 102 | ... 320 | ... | 3600 |
| frequency | 0 | 200 | 250 | 180 | ... 20 | ... | 2 |

TABLE 9

Global Probability Distribution Representation for the resting positions and times of mouse.

| Global Resting position | | | | | | | |
|---|---|---|---|---|---|---|---|
| (0, 0) Time (seconds) | 0 | 10 | 11 | 12 | ... 450 | ... | 3600 |
| frequency | 0 | 0.06 | 0.09 | 0.09 | ... 0.15 | ... | 0.01 |
| (200, 200) Time (seconds) | 0 | 10 | 101 | 102 | ... 320 | ... | 3600 |
| frequency | 0 | 0.10 | 0.08 | 0.07 | ... 0.18 | ... | 0.0 |

With both the user probability distribution representation and the global probability distribution representation, the system may apply a formula, rule or algorithm for example, to determine whether it is probable that the purported authorized user is in fact the authorized user. In this example or embodiment, the comparison may be made by applying Bayes Rule to determine a posterior probability the observed user is the alleged user. It will be appreciated by those of ordinary skill in the art that Bayes Rule is one of numerous ways to determine a probability here, with no one in particular being required to practice this invention.

The posterior probability that the observed user is the alleged user, P(A|O), is given by:

$$P(A|O)=P(A)*L/((P(A)*L)+1-P(A)),$$

where P(A) is the prior probability the user is the alleged user and
L is the likelihood ratio or probability ratio.

The likelihood ratio or probability ratio is given by P(O|A)/P(O|I), where P(O|A) is the probability the alleged user produced the observations and P(O|I) is the probability an impostor produced the observations. Based on the threshold set for the value of P(A|O), the system may log out the user or notify a security sentry of a potential breach in security.

Determining the user signature via mouse dynamics provides a means for establishing a system to monitor the identity of users continuously throughout a network of electronic devices in real time. The system to monitor user identities stores the user mouse dynamics patterns and compares the stored user mouse dynamics with the registered user purported to be using the mouse, thereby providing a probability the purported user is the identified user. The sentries of the identities establish the lower limit of the probability they find acceptable for each user. Once the probability of an identity falls below this limit, the system notifies the sentries and executes any pre-defined actions that it can machine execute through automated scripts or software applications.

The present invention may use mouse dynamics to provide an alternative or additional factor of authentication for the user. Probability distribution representations may be constructed to determine a probability or a likelihood that a user is a legitimate user for a device or system (e.g. an individual account within the system). Embodiments of this invention may provide a system which notifies security sentries and/or others, when a new user is entering the system; and may train the probability distribution representations for the new user and to notify security sentries when an illegitimate user is using an authorized user's account or device.

Embodiments of this invention provide a method to identify users using behaviormetrics for the purpose of authorizing electronic transactions. The invention supplies an additional factor of authentication without additional hardware or intrusive means. The user behaviormetric signature becomes the user's signature for authorizing transactions. This invention uses probability tables to produce a faster more scalable implementation of determining if a user at an input device at a transaction terminal is the legitimate user. This invention also provides a system that notifies security alerts to sentries and configured executable actions to rejected authorization events.

Embodiments of the present invention may use behaviormetrics to authenticate electronic transactions. Probability profiles may be constructed to provide the user signature to authenticate transactions. Embodiments of this invention may also supply a system by which to notify security sentries when the likelihood the active user is not the alleged user to prevent unauthorized transactions and execute actions related to unauthorized transactions.

Embodiments of this invention may define a method and a system for establishing user identity by way of behaviormetrics for the purpose of authorizing electronic transactions. Embodiments of the system may notify security sentries when a discrepancy occurs between the active user and the archived user. From this information the transaction can be allowed or rejected or require further identification from the user FIG. 1 is a perspective view of a user utilizing a typical automated teller machine 100, an electronic transaction input device, utilizing a keypad, illustrating user's hand 103, keypad keys 101, auxiliary keys 102, screen 104, which may be an X-Y device such as a touch screen 104. The touch pad keys 101 are similar to keyboard keys.

Some aspects of this invention may capture or access the timing of certain keystrokes as one exemplary data element, or as a characteristic. Examples given below would be for a sequence of typing the keys such as ABC (which could also be for example 123), and another example referencing the typing of keys BCD (which could also be for example 234). However, it will be appreciated that the typing of any key sequence may be utilized depending upon the data, and the comparisons where authentication may be sought. It will also be appreciated by those of ordinary skill in the art that any one of a different number of keys may be included within the sequence to arrive at data to be utilized in aspects of this invention. For example, in the illustration shown in FIG. 1, a key stroke sequence may be established for different keys or buttons on the ATM machine, which may represent a common sequence, personal identification number (PIN) or other commonly typed keys by users whose financial transaction is being authenticated. Any sub-combination, reverse combination or shorter or longer combinations may also be utilized.

It will also be appreciated by those of ordinary skill in the art that because embodiments of this invention have so many different applications, the term data as used herein may constitute a multitude of different measurements, characteristics, timings or any other element that can be measured or used to distinguish different individual users, different users within identified demographics and different demographic groups, to name a few.

Figure 2:
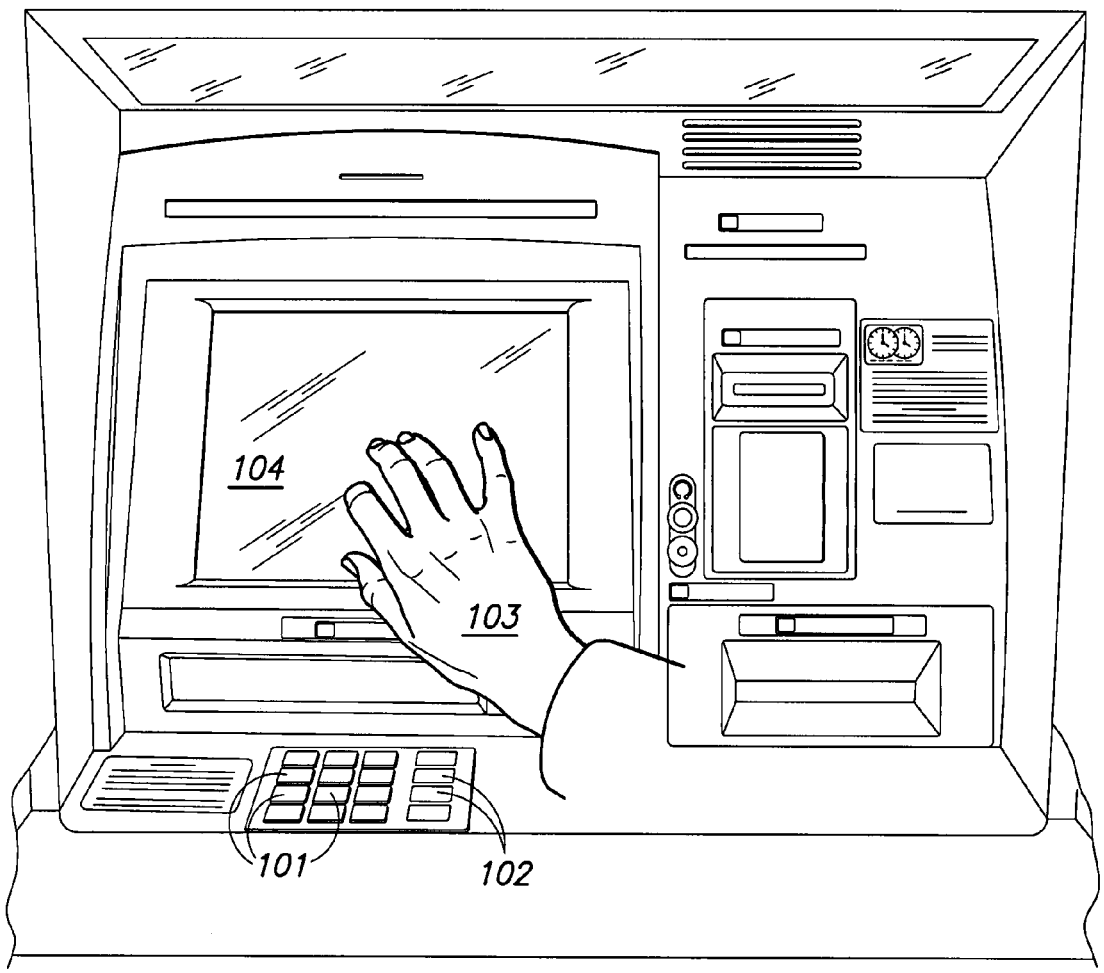
FIG. 2 is a perspective view of a user utilizing an exemplary touch screen.

FIG. 2 is a perspective view of a user utilizing an exemplary touch screen on an ATM. 100, which is an X-Y device based electronic transaction input device. FIG. 2 shows user's hand 103, keypad keys 101, auxiliary keys 102, X-Y device or touch screen 104, which may be an X-Y device requiring some movement or it may require movement more like a keyboard.

The touch screen such as item 104 in FIG. 2 may be pressure sensitive or pressure monitoring and monitor the pressure at which the touch screen is used, which may therefore constitute part or all of the electronic signature for the electronic transaction. Alternatively it could be inputted from the screen of a PDA device (another example of a possible X-Y device) with a pen or stylus, which then records and transmits the signature, wherein the signature not only contained the physical signature of the user, but this could be combined with any one of a number of different other signature aspects, such as pressure, etc. on the X-Y device.

Figure 3:
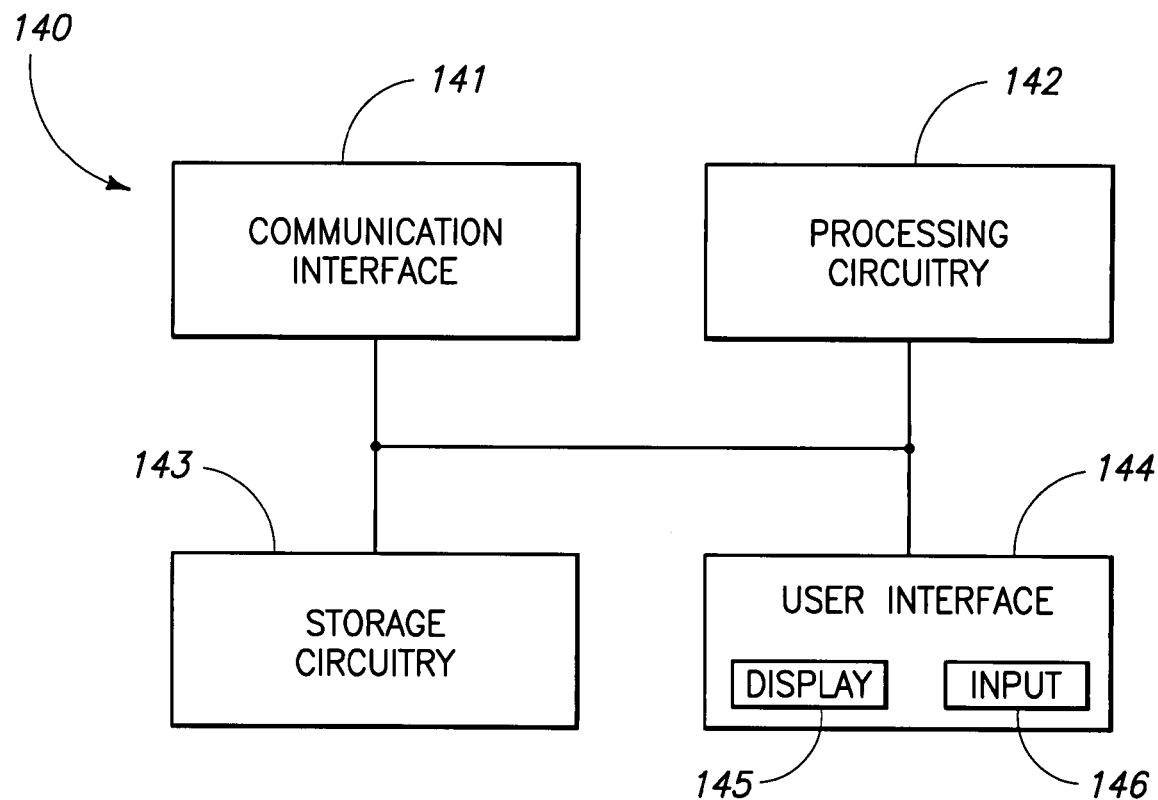
FIG. 3 is a block diagram of an exemplary data processing apparatus.

The touch screen 104 in FIG. 3 may also be like an electronic signature screen wherein a stylus or pen is utilized to create an on screen electronic signature. The signature itself would then be part of an overall electronic identification, and may be combined with the timing of the movement of the stylus or pen, or the pressure at different parts of the signature. The signature combined with one or more of the other or additional identifiers (pressure, movement, timing of movements, etc.) may then constitute a composite signature or identifier to authenticate the user or person inputting to the financial transaction.

FIG. 3 is a block diagram of an exemplary data processing apparatus 140. FIG. 3 illustrates that communications interface 141 is arranged to implement communications of computing device 140 with respect to external devices not shown. For example, communications interface 141 may be arranged to communicate information bi-directionally with respect to computing device 140. Communications interface 141 may be implemented as a network interface card (NIC), serial or parallel connection, USB port, FireWire interface, flash memory interface, floppy disc drive, or any other suitable arrangement for communicating with respect to computing device 140.

In one embodiment, processing circuitry is arranged to process data, control data access and storage, issue commands, and control other desired operations. Processing circuitry 142 may comprise circuitry configured to implement desired programming provided by appropriate media in at least one embodiment. For example, the processing circuitry 142 may be implemented as one or more of a processor and/or other structure configured to execute executable instructions including, for example, software and/or firmware instructions, and/or hardware circuitry. Exemplary embodiments of processing circuitry include gloom hardware logic, PGA, FPGA, ASIC, state machines, and/or other structures alone or in combination with a processor. The storage circuitry 143 is configured to store programming such as executable code or instructions (e.g., software and/or firmware), electronic data, databases, or other digital information and may include processor-usable media. Processor-usable media may be embodied in any computer program, product(s), or article of manufacture(s) which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semi conductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 143 described above and/or communicated via a network or other transmission media and configured to control appropriate processing circuitry 142.

For example, programming may be provided via appropriate media including, for example, embodied within articles of manufacture, embodied within a data signal (e.g. modulated carrier wave, data packets, digital representations, etc.) communicated via an appropriate transmission medium, such as a communication network (e.g. the Internet and/or a private network), a wired in electrical connection, optical connection and/or electromagnetic energy, for example, via a communications interface 141, or provided using other appropriate communication structure or medium. Exemplary programming including processor-usable code may be communicated as a data signal embodied in a carrier wave in but one example.

User interface 144 is configured to interact with a user including conveying data to a user (e.g., displaying data for observation by the user, audibly communicating data to a user, etc.) as well as receiving input from the user (e.g., tactile input, voice instruction, etc.). Accordingly, in one exemplary embodiment, the user interface may include a display 145 (e.g., cathode ray tube, LCD, etc.) configured to detect visual information as well as a keyboard, mouse, touch pad, and/or other input device 146. Any other suitable apparatus for interacting with a user may also be utilized, including three-dimensional interfaces which instead of merely being on an X-Y plane may include three dimensions, namely X, Y and Z.

It will be understood that when components, apparatus, appliance, functions, steps or elements of this invention need to be or may be implemented on a data processing apparatus as a whole, or any individual component thereof described herein, that the apparatus or any individual component as described herein may be utilized within the contemplation of this invention. For instance if a flowchart as described below expressly or implicitly requires for example that a processor or storage for example be utilized, the applicable components described herein with respect to FIG. 3 may be so utilized even if not specifically recited for that step.

FIG. 4 is a exemplary flowchart illustrating one embodiment of this invention, wherein a sequence of logical steps are shown which may be employed to define and store the behaviormetrics to be recorded and stored for a particular input device of any type. FIG. 4 illustrates an embodiment of a process flow of the method for defining the behaviormetrics of the input devices associated with an electronic transaction. The system queries 201 the device to determine the type of device such as keyboard 202, keypad 203 or touch screen 204. The behaviormetrics 206 as allowed by the input device are defined and entered 205. The threshold limits to designate an imposter for the behaviormetrics of the device 207 are entered. The behaviormetrics for such device is then stored 208 to be monitored for the device in the device database 209.

FIG. 5 is an exemplary flowchart illustrating an embodiment of this invention, wherein the sequence of logical steps may be employed to monitor and store the behaviormetrics of a user for a specified input device. FIG. 5 illustrates the process flow for determining the user's behaviormetric signature for associated input devices. The system registers the user 210 into the user database 211. The system queries 212 the input device 213-215 at the input terminal. The user enters 216 a user-defined code 217 which is unique to the user. The code can be a chosen PIN or social security or password, etc. The system records 218 the behaviormetrics registered in the device database 219 for the device under question with respect to the user inputting the code. The system calculates 220 the user probability table and the global probability table based on the behaviormetric inputs. The system stores 221 the user probability table as the user behaviormetric signature into the user database 211 and stores the updated global probability table into the user database.

FIGS. 6 & 7 are exemplary flowcharts illustrating an embodiment of this invention, wherein the sequence of logical steps employed to configure a system to compare a current user against an archived user, store the transactions, notify the proper sentries when a discrepancy occurs and take corrective actions.

FIG. 6 illustrates the process flow for configuring the security sentries, the means for contacting the sentries and the corrective actions regarding a discrepancy in user identification. The sentry is entered into the system 222, and then the means to contact the sentry are entered 223. The means to contact the sentry can be email, text messaging, telephone, paging, etc 224. The system queries the registered users 225 from the user database 226 to be identified on the network or device. The users are grouped 227, and the sentry is assigned to the group 228 to be the users under the sentry's auspices. Once the sentry is configured, the system stores the sentry information 229 into the sentry database 230. Any alert messages 231 and any corrective actions 232 for the sentry or sentries to execute are entered into the system. For example, actions to execute could be physically observing the user or turning on a camera to observe the user. Any executable corrective actions for the system to execute are entered 233 as ancillary actions for the sentry. System actions, for example, could include logging the user out of the system and preventing re-entry. The system stores 234 all alert messages, sentry corrective actions and executable corrective actions associated with a sentry or sentries into the sentry database 230.

FIG. 7 illustrates the process flow for authenticating the users' identities through behaviormetrics, rejecting or allowing the electronic transaction, and alerting the security sentries in case of a discrepancy. The user enters 235 their unique code at the transaction terminal. The system holds 239 the transaction 240 until authorization. The behaviormetrics for the input device 236-238 associated with the transaction terminal are recorded 241. The system queries 242 the archived user 243 behaviormetrics for such a device and matches the behaviormetric profile of the active transaction to the stored behaviormetric profile 244. If the match is within a pre-defined threshold 245, the system authorizes the transaction 246 and stores 247 the transaction event in the transaction database 248 with the matching information.

If on the other hand the match is outside of a pre-defined threshold, the system rejects the authorization 249 and either requests an additional factor of authentication 250 or denies further electronic transactions by that purported authorized user-until some other authentication or action is taken. Additional factors can be the user showing their identification, other biometric devices such as fingerprint scans or user identified cards such as credit cards. If the additional factor of authentication authorizes 251 the transaction system continues with authorizing the transaction 246. If the additional factor or identifier of authentication fails, the system queries 252 the security sentry database 257 for the sentries and actions associated with a non-authorization event. The system sends 253 messages 254 to the sentries and executes any actions 255. The system stores the non-authorization event 256 into the sentry database 257 before continuing on to store the transaction event 247 into the transaction database 248.

The system executing any actions 255 in response to the failure of the additional identifier or factor, may include placing a hold that that user's account, sending an alarm to the system operator, causing an ATM to retain the card (if applicable), or any one of a number of different executions depending on the embodiment of the invention.

Figure 8:
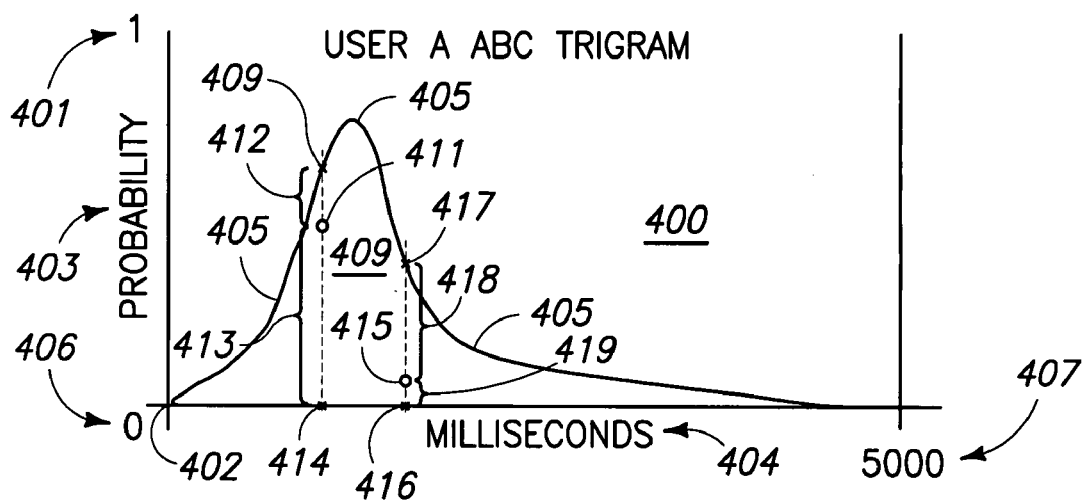
FIG. 8 is a graphic representation of one embodiment of a probability distribution representation for keystroke timings of a user typing keystrokes for the key combination of ABC.

FIG. 8 is a graphic representation of one embodiment of a probability distribution representation 400 for keystroke timings or dynamics of a user, User A, typing keystrokes ABC, sometimes referred to as a trigram since three keys are included. Even though there are three keys being identified as data or a characteristic for a given application, any other type of measurement, type or combination of measurements may be taken to quantify that characteristic, and then utilized to distinguish and authorize the user possessing those characteristics from the remainder of the wide population or global population from which it is desired to distinguish the authorized user. Item 401 is the numeral one and indicates that the probability goes from zero represented by item 406, to the number one represented by item 401, as will be appreciated by those of ordinary skill in the art, on a statistical modeling basis. The probability 403 is graphed in the Y direction and the time 404 in this aspect or embodiment of the invention is measured in milliseconds. The graphic representation shows the time 404 going from zero, which is represented by item 406, to 5000 milliseconds represented by item 407.

FIG. 8 also illustrates how a couple of units of data may be compared against the user profile or probability distribution representation 400. For instance if data 411 is obtained at the millisecond level represented by 414, it may be expected that User A would show a value at the intersection represented by 409. However the data 411 is located some distance below intersection 409. The distance 412 from data 411 to intersection 409 is represented by bracket 412 and the distance 413 between data 411 and intersection 414 is represented by bracket 413. In this example a visual check on the location of data 411 at the milliseconds represented by intersection 414, would indicate it is more probable than not that the data point represents User A. It will be appreciated by those of ordinary skill in the art that depending upon the probabilities and the sensitivity and scaling of the probability distribution representation, a greater or lesser distance may or may not be indicative that it is more probable that the purported authorized user is in fact the authorized user, namely User A.

It will be appreciated by those of ordinary skill in the art that for illustrative purposes, graphical representations of the probability distribution representations are shown in the figures; however, any type of representation thereof may be utilized within the contemplation of this invention, such as graphical representations, database or other data structure representations, or any nongraphical representations of the probability distribution, with no one in particular being required to practice this invention.

In a second example in FIG. 8, data 415 is shown with intersection 416 indicating the number of milliseconds, and intersection 417 indicating the intersection with the user profile or trigram for User A. Distance 418 from intersection 417 and distance 419 from intersection 416 would be utilized in any one of a number of different ways to calculate a probability that data 415 is indicative of use by the authorized user, namely User A.

It will also be appreciated by those of ordinary skill in the art that the representation shown in FIG. 8 need not be limited to keyboard dynamics, but may also include an X-Y dynamic related to the speed at which a user moves the X-Y device, such as mouse speed from point A to point B.

FIG. 8 represents one aspect of an embodiment of this invention wherein a trigram or three key keystroke is utilized to pattern or fingerprint User A, which can be one measurement taken of User A, or it could be an averaging or other statistical representation of two or more measurements blended together to arrive at curve 405 in FIG. 8, up to some very high number of measurements scaled to present one probability distribution representation. FIG. 8 shows a narrow band of occurrences in milliseconds relative to probability, making User A relatively distinctive from a wide population sampling or from the global probability distribution representation. In embodiments of this invention, the area 409 under curve 405 should also be one based upon probability distribution representation analysis. The curve 405 is a first constant that gives a continuous basis upon which to compare new data or data on curve 405, to a global trigram such as the global trigram set forth in FIG. 10 for the ABC keystroke combination.

Figure 9:
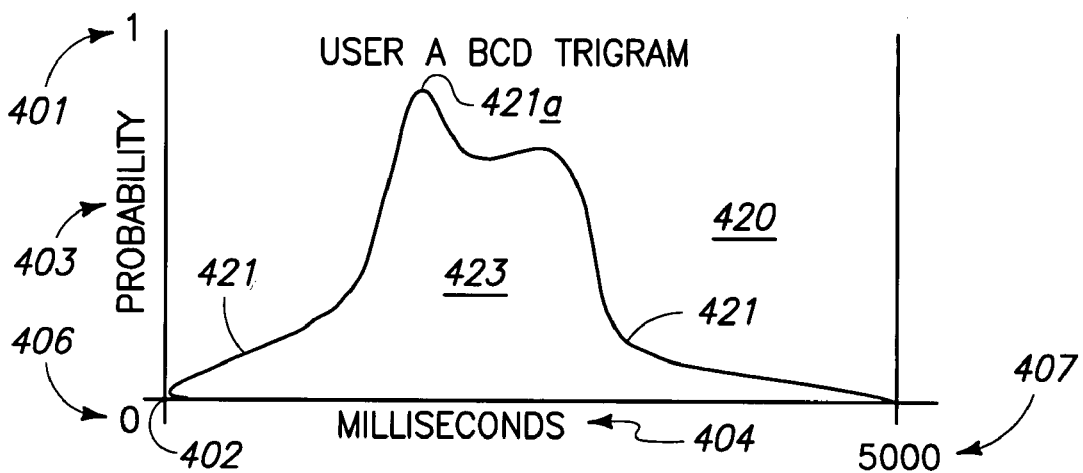
FIG. 9 is a graphic representation of one embodiment of a probability distribution representation for keystroke timings of a user typing keystrokes for the key combination of BCD.

Since many features are recorded for keystroke dynamics, the probability distribution representations can be used to determine more distinguishing features of a user. Those of ordinary skill in the art will appreciate that the same or similar features may be recorded for X-Y device dynamics. In turn, the distinguishing features can be used to construct a biased scoring system to authenticate the user. FIGS. 8-11 illustrate the graphs of the probability distribution representations constructed from the data in Tables 2 and 4. FIG. 8 is the graph for the User A probability distribution representation for the trigram ABC and FIG. 9 is the graph for the User A probability distribution representation for the trigram BCD. FIG. 10 is the graph for the global probability distribution representation for the trigram ABC and FIG. 11 is the graph for the global probability distribution representation for the trigram BCD.

Overlaying the graphs between the user and the global user base for each trigram, FIGS. 12 and 13, and calculating the difference in area 470 and 471 respectively, between the curves, which is the hashed area between the graphs, the ABC trigram user probability distribution representation shows a larger deviation from the global or wide population probability distribution representation. Therefore, the ABC trigram is a more distinguishing feature for the user. Total difference in area under the User A and the global probability curves for the ABC trigram is 1.1, while the total difference in area for the BCD trigram is 0.20. Normalizing these values produces a weighting vector for calculating the final posterior probability. The weighting vector is 0.85 and 0.15 for the ABC and BCD trigrams respectively, yielding a final posterior probability given by equation 1.

$$\text{Posterior}_{final} = (0.85 * \text{Posterior}_{ABC}) + (0.15 * \text{Posterior}_{BCD}) \quad (1)$$

The total posterior calculated for determining the likelihood that a user is User A is now biased towards the posterior probability returned from the ABC trigram measurement. An impostor or purported authorized user will more likely fall in the global likelihood and the calculated total posterior will reflect a strengthened likelihood the impostor will be detected as such. The weights attributed to the features of the trigram measurements can also be used in constructions of neural networks, support vector machines and boosting algorithms to further strengthen the bias of the more distinguishable features of an individual.

FIG. 9 is a graphic representation of one embodiment of a probability distribution representation for keystroke timings of a user typing keystrokes BCD. The graphical item numbers, item descriptions and the descriptions of the graph format, the X and Y parameters and measurements, is recited above with respect to FIG. 8, and all like items are numbered accordingly and a description thereof will not be repeated here to avoid repetition. FIG. 9 is a graphic representation of User A typing a keystroke combination of BCD, a trigram, which provides a table of a similar graphic representation, but a very different curve than that shown for User A for the ABC trigram in FIG. 8. The curve illustrated in FIG. 9 is very different than the curve illustrated in FIG. 8 for the same user, namely User A. the area 423 under curve 421 in probability distribution representation 420 should be one. Curve 421 peaks at 421a.

FIG. 10 is a graphic representation of one embodiment of a probability distribution representation for keystroke timings of a wide population demographic user group typing keystrokes ABC. The graphical item numbers, item descriptions and the descriptions of the graph format, the X and Y parameters and measurements, is recited above with respect to FIG. 8, and all like items are numbered accordingly and a description thereof will not be repeated here to avoid repetition.

FIG. 10 illustrates a wide population first characteristic probability distribution representation, in this example, a global ABC trigram probability distribution representation, which also may be referred to as a histogram or a bar chart. FIG. 10 shows curve 441 with curve peak 441a, area 443 under curve 441 on probability distribution representation 440 illustrates the probabilities of timing of the wide population.

It will be appreciated by those of ordinary skill in the art that the selection of the first characteristic upon which to take data for, or the second third or later characteristics, will be something that greatly depends upon the facts and circumstances of the application, readily available data, readily available measurements and numerous other factors, all within the contemplation of this invention. The wide population characteristic probability distribution representation construction provides a very scalable method of taking data in quantities that can be determined from the circumstances, including huge numbers of data points, to construct a probability distribution representation or histogram against which to compare characteristics or data of individuals. In some applications the wide population data or characteristic can comprise the probability distribution representation profile table or graph, and in others it may represent data from multiple, numerous or a multitude of persons (such as within a demographic or within a broader universe).

FIG. 11 is a graphic representation of one embodiment of a probability distribution representation for keystroke timings of a wide population demographic user group typing the keystrokes BCD. The graphical item numbers, item descriptions and the descriptions of the graph format, the X and Y parameters and measurements, is recited above with respect to FIG. 8, and all like items are numbered accordingly and a description thereof will not be repeated here to avoid repetition.

FIG. 11 represents a probability distribution representation 460 for the wide population data for the keystroke BCD combination or trigram, with area 463 under curve 461. Similar to the global or wide population probability distribution representation in FIG. 10, the probability distribution representation 460 in FIG. 11 may be that of numerous data points from one individual, or from a wide population of numerous individuals, depending upon the application and the distinction desired.

FIG. 12 is a graphic representation of one embodiment of a probability distribution representation for a user typing the keystrokes ABC illustrated in FIG. 8, overlaid on the embodiment of the probability distribution representation for keystroke timings of a wide population demographic user group typing keystrokes ABC illustrated in FIG. 10. The graphical item numbers, item descriptions and the descriptions of the graph format, the X and Y parameters and measurements, is recited above with respect to FIG. 8, and all like items are numbered accordingly and a description thereof will not be repeated here to avoid repetition. Again, neither a graphical representation nor an overlay is required to practice this invention, but is shown in FIGS. 12 and 13 for illustrative purposes.

FIG. 12 illustrates some of the numerous possibilities for use of the probability distribution representations or histograms as may be utilized by the embodiment of this invention. The probability distribution representation illustrated in FIG. 12 is an overlay of the probability distribution representation in FIG. 8 of User A typing ABC trigram, onto the global ABC trigram illustrated in FIG. 10, showing dramatic distinctions or uniqueness between User A from the rest of the population, indicating this may be a more accurate characteristic or data point upon which to distinguish User A from the general population and authenticate the keystrokes of User A. Curve 405 is the User A curve profile on probability distribution representation, and curve 441 is the global or wide population curve for the keystrokes ABC. The area 470 between curve 405 and curve 441 provides a larger area upon which to distinguish or compare a given data point placed therein to the User A curve versus the wide population curve 441.

FIG. 13 is a graphic representation of one embodiment of a probability distribution representation for a user typing the keystrokes BCD illustrated in FIG. 9, overlaid on the embodiment of the probability distribution representation for keystroke timings of a wide population demographic user group typing keystrokes BCD illustrated in FIG. 11. The graphical item numbers, item descriptions and the descriptions of the graph format, the X and Y parameters and measurements, is recited above with respect to FIG. 8, and all like items are numbered accordingly and a description thereof will not be repeated here to avoid repetition.

In a similar manner to FIG. 12, FIG. 13 is an overlay of the User A BCD trigram, which is User A typing a sequence of keys on a keyboard, namely keys B, C, and D, as represented by curve 421. Curve 461 is the wide population curve illustrated in FIG. 11 of the same keystrokes, namely keystrokes BCD. From comparing curve 421 to curve 461 in FIG. 13, it is apparent that User A is very similar to the wide population curve 461 and in comparing the results of the overlay shown in FIG. 13 to that in FIG. 12, it becomes very apparent that in choosing the best characteristic of this set to use to distinguish User A from the general population is keystroke combination ABC and not the keystroke combination BCD.

Figure 14:
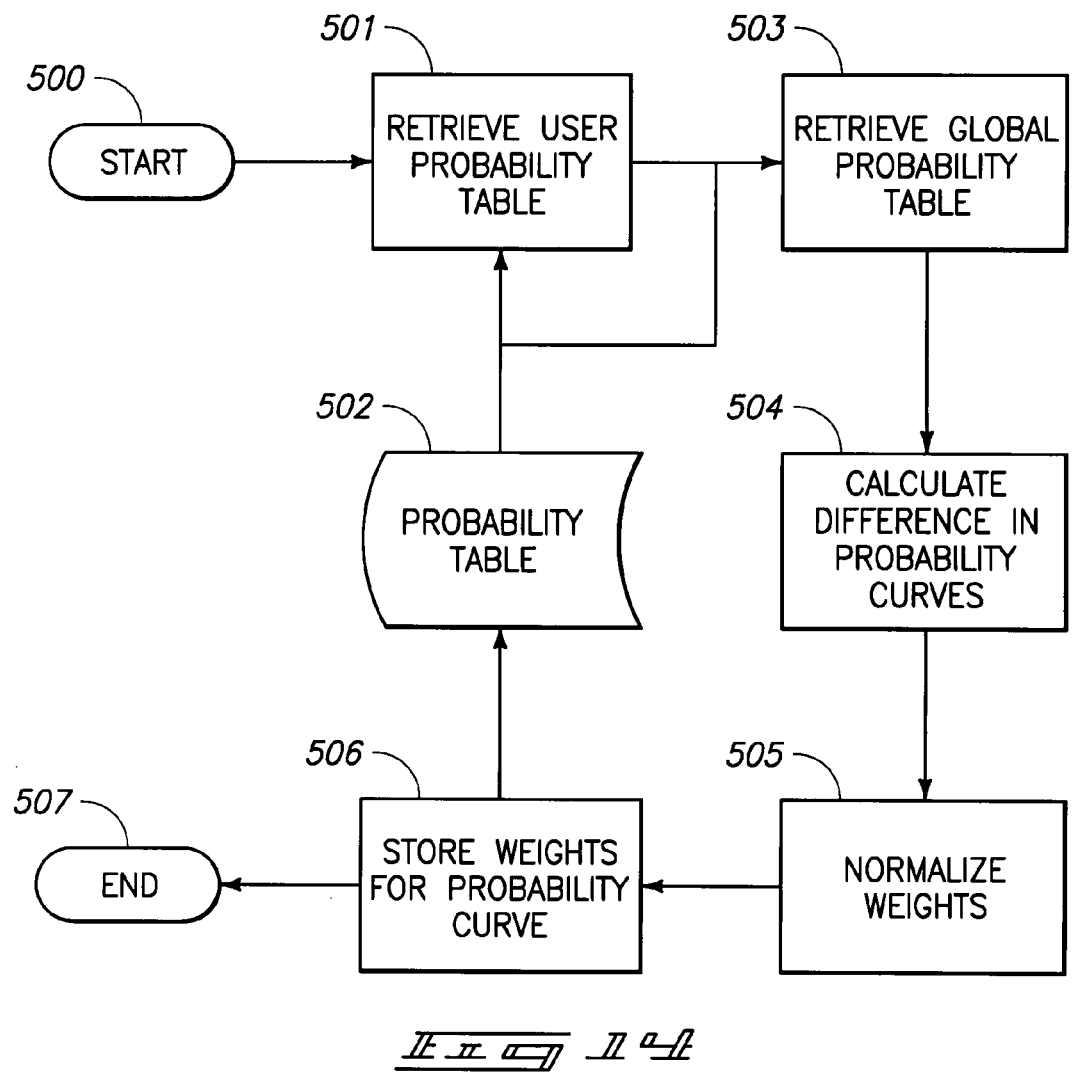
FIG. 14 is an example of a flowchart of an embodiment of this invention illustrating one possible sequence for constructing a biased scoring system using a characteristic data of an authorized user.

FIG. 14 is an example of a flowchart of an embodiment of this invention illustrating one possible sequence for constructing a biased scoring system using a characteristic data of an authorized user. FIG. 14 illustrates the process flow to construct weights for the features captured by keystroke dynamics. The system includes start 500, a retrieval of user probability distribution representation 501 from the probability distribution representations 502 for data, characteristics or identifying features for a user or an authorized user. The system retrieves the 503 global probability distribution representations 502 for each feature recorded for the global user base. The probability curve of the user is compared to the global probability curve and a value is calculated 504 for each feature based on the difference the user probability curve deviates from the global probability curve. The values may be normalized 505 to construct a weighting vector for the set of features recorded for keystroke dynamics. The values from the normalization are stored 506 with the probability distribution representations for each feature recorded for the user.

Figure 15:
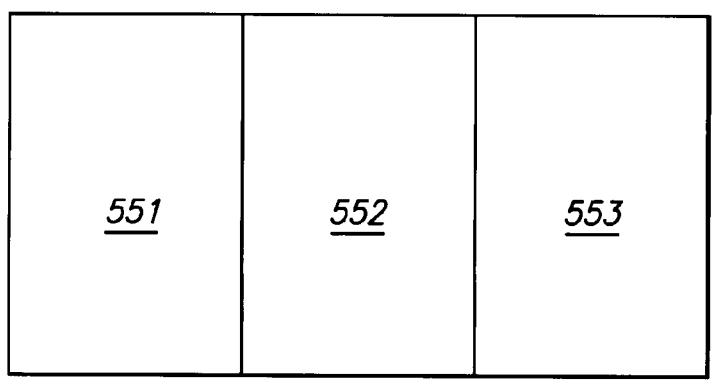
FIG. 15 is a schematic representation of an identifier or signature unit or packet, which may be utilized in embodiments of this invention.

Other aspects of this invention utilize a behaviormetric based authorization system or method which may utilize a unique unitized identifier, or identifier unit, which includes at least one behaviormetric, which is shown schematically in FIG. 15. An identifier unit may include one or more typical identifiers, such as (without limitation): possession of a money card, debit card or credit card; knowledge of a password; knowledge of a PIN; knowledge of a user identification or other identifier. One or more of these traditional identifiers may now be combined in embodiments of this invention with one or more behaviormetrics, to comprise in combination, an identifier unit. Additionally utilizing one or more behaviormetrics is more comparable to an in-person transaction at a vendor wherein identification such as a driver's license is required to be shown to further identify the purported authorized user. It will however be noted that the use of behaviormetrics as described in this invention may also be utilized for person to person transactions as well as additional security.

This additional identifier has not heretobefore been readily or sufficiently available for transactions, including those transactions in which there is not a personal or person to person interaction with the purported authorized user. While embodiments of this invention may therefore provide for an electronic transaction to be authorized by a combined identifier system which includes at least one behaviormetric combined with one or more traditional identifiers, it will be appreciated that it may also be combined with face to face identification systems or methods as well, all within the contemplation of this invention.

FIG. 15 therefore schematically shows an identifier unit 550 with first identifier 551, second identifier 552 and third identifier 553, wherein the first identifier may be a traditional identifier, the third identifier 553 a behaviormetric of the purported authorized user, and the second identifier may be either of the two. It will be noted that any one or more traditional identifiers and any one or more behaviormetric identifiers may be utilized within the contemplation of this invention. This identifier unit 550 may be referred to as a signature unit, a signature packet, an identification packet, a fingerprint unit or a composite identification unit as it provides a more unique identification combination or composition than traditional ways of identifying a purported authorized user of an electronic transaction system.

The identifier unit 550 or packet may then analyzed right at the input device or may be transmitted to a centralized transaction authorization center by any one of known means and wherein the units may be analyzed to determine a probability that the purported authorized user is in fact the authorized user, and then approve or disapprove the transaction based on the comparings.

It will also be noted that other behaviormetrics, without limitation, which may be utilized in embodiments or applications of this invention, may include: finger angles on a touch screen; finger width; applied pressure on a touch screen or key pad; finger roll or other movement on a touch screen; the use of finger nails during the entry process; finger width; and others, all within the contemplation of this invention.

It will be noted that because a probability distribution reference or a wide population probability distribution reference are utilized, and only one comparison needs to be made to that probability distribution reference with characteristic data of users, the speed of the comparing will not be diminished as a result of adding new data to train or further comprise the probability distribution reference. This feature makes embodiments of this invention very scalable and potentially on a near unlimited basis, without decreasing the speed of the comparings. Due to the nature of the wide population probability distribution reference, a very large number of new data points for a characteristic may be added to the global or wide population probability distribution reference without decreasing the speed because only one comparison needs to be made to test new or ongoing data against the wide population probability distribution reference on an ongoing or real-time basis. These additions or new data points for addition or integration into probability distribution references or wide population probability distribution references will be stored in storage circuitry. The speed of the updated probability distribution references will compare at the approximate same speed as the probability distribution references before being updated because a comparison is still being made against one such probability distribution reference, albeit an updated one with more data support.

As will be appreciated by those of reasonable skill in the art, there are numerous embodiments to this invention, and variations of elements, steps and system components which may be used, all within the scope of this invention.

One embodiment of this invention for example is a behaviormetrics based electronic transaction authorization method, comprising: accessing data from an authorized user of an electronic transaction system; using the data to create a first characteristic probability distribution representation indicative of a behaviormetric of the authorized user; accessing new data from a purported authorized user of the electronic transaction system; comparing the new data to the first characteristic probability distribution representation for the authorized user; and determining a probability that the purported authorized user of the electronic transaction system is the authorized user based on the comparing.

A further embodiment of that disclosed in the preceding paragraph may further comprise: accessing the data from the authorized user; using the data to create a second characteristic probability distribution representation indicative of the authorized user of the electronic transaction system; accessing the new data from a purported authorized user; comparing the new data of the purported authorized user to the second characteristic probability distribution representation for the authorized user; and determining a probability that the purported authorized user is the authorized user based on the comparing of the new data to the first characteristic probability distribution representation and to the second characteristic probability distribution representation for the authorized user. A still further embodiment of that disclosed in the preceding paragraph may integrate updated data into the first characteristic probability distribution reference without increasing time required for comparing the new data of the purported authorized user to the first characteristic probability distribution representation for the authorized user. A further embodiment may also provide providing a wide population first characteristic probability distribution representation indicative of the first characteristic of a wide population; comparing the new data of the purported authorized user to the first characteristic probability distribution representation for the authorized user and to the wide population first characteristic probability distribution representation; and determining a probability that the purported authorized user is the authorized user based on the comparing; and/or further integrate updated data into the wide population first characteristic probability distribution reference without increasing time required for comparing the new data of the purported authorized user to the first characteristic probability distribution representation for the authorized user and to the wide population first characteristic probability distribution representation. Some of these embodiments may further determine the probability that the purported authorized user is the authorized user through the application of Bayes Rule to the new data, the first characteristic probability distribution representation for the authorized user, and the wide population first characteristic probability distribution representation.

It will be appreciated that embodiments of this invention may be utilized in combination with electronic financial transaction devices of all kinds, including without limitation: wherein the data is one of a keypad dynamic and an X-Y device dynamic; wherein the X-Y device dynamic is a touch screen dynamic; wherein the data comprises an electronic identifier comprised of both a known data entry identifier and behaviormetric data; wherein the known data entry identifier is one of a user password and a user personal identifier; and/or wherein the behaviormetric data is one of a keypad dynamic and an X-Y device dynamic.

It will also be appreciated that embodiments of this invention may require further identifiers of the authorized user if the determining of the probability that the purported authorized user of the electronic transaction system yields a negative indication based on the comparing.

In a method embodiment of this invention, a behaviormetrics based method for determining a more probable authentication method for authorizing electronic transactions may be provided, comprising: accessing data from an authorized user of an electronic transaction system; using the data to create a first characteristic probability distribution representation indicative of a first behaviormetric of the authorized user; using the data to create a second characteristic probability distribution representation indicative of a second behaviormetric of the authorized user; providing a wide population first characteristic probability distribution representation indicative of the first characteristic of a wide population; providing a wide population second characteristic probability distribution representation indicative of the second characteristic of a wide population; comparing the first characteristic probability distribution representation indicative of the authorized user to the wide population first characteristic probability distribution representation indicative of the first characteristic of a wide population; comparing the second characteristic probability distribution representation indicative of the authorized user to the wide population second characteristic probability distribution representation indicative of the second characteristic of a wide population; determining which of the comparings yields a more probable characteristic for authenticating the authorized user from the wide population.

In a further embodiment of the method described in the preceding paragraph, a behaviormetrics based method for determining a more probable authentication method for authorizing electronic transactions may be provided which further comprises: accessing new data from a purported authorized user; comparing the new data of the purported authorized to probability distribution representations of the more probable characteristic for authenticating the authorized user from the wide population; further wherein the first characteristic probability distribution representation indicative of the authorized user is comprised of one of a keyboard dynamic and an X-Y device dynamic; and/or further wherein the X-Y device dynamic is one of a mouse input and a touchpad dynamic.

In yet another embodiment of the invention, a financial transaction identifier unit is provided for use in authorizing financial transactions, the identifier unit comprising: a unique physical identifier; and a behaviormetric identifier of a purported authorized user.

In a related embodiment of the invention, a behaviormetrics based electronic transaction authorization method is provided, comprising: accessing an identifier unit from a purported authorized user of an electronic transaction system, the identifier unit comprising a unique physical identifier; and a behaviormetric identifier of a purported authorized user; verifying that the unique physical identifier is authorized; comparing the behaviormetric identifier to a corresponding behaviormetric probability distribution representation indicative of a behaviormetric of the authorized user; and determining a probability that the purported authorized user of the electronic transaction system is the authorized user based on the comparing. It will be noted that the identifier unit referred to herein may include one or more unique physical identifiers and one or more behaviormetric identifiers relative to that authorized user.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A computerized method for authenticating an electronic transaction, comprising:
　　accessing a first data characteristic of a purported authorized user of an electronic system measured performing a first prescribed interaction with an input device of the electronic system;
　　accessing a first probability distribution representation for an authorized user performing the first prescribed interaction;
　　accessing a first probability distribution representation for a wide population performing the first prescribed interaction;
　　determining a first value indicative of whether the purported authorized user is the authorized user, utilizing (a) the first data characteristic of the purported authorized user, (b) the first probability distribution representation for the authorized user, and (c) the first probability distribution representation for the wide population;
　　accessing a second data characteristic of the purported authorized user of the electronic system performing a second prescribed interaction with an input device of the electronic system;
　　accessing a second probability distribution representation for the authorized user performing the second prescribed interaction; and
　　accessing a second probability distribution representation for the wide population performing the second prescribed interaction;
　　determining a second value whether the purported authorized user is the authorized user, utilizing (a) the second data characteristic of the purported authorized user, (b) the second probability distribution representation for the authorized user, and (c) the second probability distribution representation for the wide population; and
　　authenticating the electronic transaction, if a total value, based on the first value and the second value, is above a prescribed threshold.

2. The computerized method for authenticating an electronic transaction as recited in claim 1, wherein the first data characteristic of the purported authorized user incorporate a plurality of instances of the purported authorized user performing the first prescribed interaction.

3. The computerized method for authenticating an electronic transaction as recited in claim 1, further comprising accessing a belief value indicative of a prior probability whether the purported user is the authorized user.

4. The computerized method for authenticating an electronic transaction as recited in claim 3, wherein, in the determining steps, the utilizing further includes the belief value.

5. The computerized method for authenticating an electronic transaction as recited in claim 1, wherein the input device is a video camera, a keyboard, a mouse, a touchpad, a touch screen, or other X-Y device.

6. The computerized method for authenticating an electronic transaction as recited in claim 5, wherein the first interaction is measured with regards to timing, acceleration, or velocity to perform the first interaction with the input device.

7. The computerized method for authenticating an electronic transaction as recited in claim 1, wherein the first interaction and the second interaction are performed with different types of input devices.

8. The computerized method for authenticating an electronic transaction as recited in claim 1, wherein the first probability distribution representation for the wide population excludes the authorized user.

9. The computerized method for authenticating an electronic transaction as recited in claim 1, wherein the first data characteristic of the purported authorized user is a probability distribution representation for the purported authorized user performing a first prescribed interaction.

10. A computerized method for authenticating an electronic transaction, comprising:
accessing data characteristic of a purported authorized user of an electronic system performing prescribed interactions with one or more input devices, including a first prescribed interaction and a second prescribed interaction;
accessing user probability distribution representations for an authorized user based on the authorized user performing interactions with one or more input devices, including the first prescribed interaction and the second prescribed interaction;
accessing global probability distribution representations for a wide population based on the wide population performing interactions with one or more input devices, including the first prescribed interaction and the second prescribed interaction;
determining a total value indicative of whether the purported authorized user is the authorized user, utilizing (a) the data characteristic of the purported authorized user performing the first prescribed interaction and the second prescribed interaction, (b) the user probability distribution representations for the first prescribed interaction and the second prescribed interaction, and (c) the global probability distribution representations for the first prescribed interaction and the second prescribed interaction; and
authenticating the electronic transaction, if the total value is above a prescribed threshold.

11. The computerized method for authenticating an electronic transaction as recited in claim 10, wherein the data characteristic of the purported authorized user performing the first prescribed interaction incorporates a plurality of instances of the purported authorized user performing the first prescribed interaction.

12. The computerized method for authenticating an electronic transaction as recited in claim 10, wherein the first prescribed interaction is selected from a group consisting of a keystroke interaction or an X-Y device interaction.

13. The computerized method for authenticating an electronic transaction as recited in claim 10, further comprising accessing a belief value indicative of a prior probability whether the purported user is the authorized user; wherein, in the determining step, the utilizing further includes the belief value.

14. The computerized method for authenticating an electronic transaction as recited in claim 10, wherein the first prescribed interaction and the second prescribed interaction are performed with different types of input devices.

15. An electronic system for authenticating an electronic transaction, comprising:
a processing assembly programmed to execute computer-readable instructions for authenticating an electronic transaction including
accessing data characteristic of a purported authorized user of an electronic system performing prescribed interactions with one or more input devices, including a first prescribed interaction and a second prescribed interaction;
accessing user probability distribution representations for an authorized user based on the authorized user performing interactions with one or more input devices, including the first prescribed interaction and the second prescribed interaction;
accessing global probability distribution representations for a wide population based on the wide population performing interactions with one or more input devices, including the first prescribed interaction and the second prescribed interaction;
determining a total value indicative of whether the purported authorized user is the authorized user, utilizing (a) the data characteristic of the purported authorized user performing the first prescribed interaction and the second interaction, (b) the user probability distribution representations for the first prescribed interaction and the second prescribed interaction, and (c) the global probability distribution representations for the first prescribed interaction and the second prescribed interaction, and
authenticating the electronic transaction, if the total value is above a prescribed threshold.

16. The system as recited in claim 15, wherein the digital storage assembly further stores a belief value indicative of a prior probability whether the purported authorized user is the authorized user; wherein further the determining further utilizes the belief value.

17. The system as recited in claim 15, further comprising an input device selected from a group consisting of a video camera, a keyboard, a keypad, a touch screen, or other X-Y device.

18. The system as recited in claim 15, further configured to execute computer-readable instructions for monitoring interactions with the one or more input devices by the purported authorized user to update the data characteristic of a purported authorized user in the digital storage assembly.

19. The system as recited in claim 15, wherein the first prescribed interaction is selected from a group consisting of a keystroke interaction or an X-Y device interaction.

20. The system as recited in claim 15, wherein the first prescribed interaction and the second prescribed interaction are performed with different types of input devices.

* * * * *